United States Patent
Zou et al.

(10) Patent No.: US 12,259,459 B2
(45) Date of Patent: Mar. 25, 2025

(54) HALF-WAVE BACK-FOLDING DIRECTIONAL MICROWAVE DETECTION ANTENNA

(71) Applicant: Shenzhen Merrytek Technology Co., Ltd., Shenzhen (CN)

(72) Inventors: Gaodi Zou, Shenzhen (CN); Xin Zou, Shenzhen (CN)

(73) Assignee: Shenzhen Merrytek Technology Co., Ltd., Shenzhen (CN)

( * ) Notice: Subject to any disclaimer, the term of this patent is extended or adjusted under 35 U.S.C. 154(b) by 474 days.

(21) Appl. No.: 17/545,984

(22) Filed: Dec. 8, 2021

(65) Prior Publication Data

US 2022/0342065 A1   Oct. 27, 2022

(30) Foreign Application Priority Data

Apr. 27, 2021  (CN) .......................... 202110458958.5
Jul. 28, 2021   (CN) .......................... 202121726634.7
Jul. 28, 2021   (CN) .......................... 202121726640.2

(51) Int. Cl.
*G01S 13/56*   (2006.01)
*H01Q 9/42*    (2006.01)

(52) U.S. Cl.
CPC ............... *G01S 13/56* (2013.01); *H01Q 9/42* (2013.01)

(58) Field of Classification Search
None
See application file for complete search history.

(56) References Cited

U.S. PATENT DOCUMENTS

| | | | |
|---|---|---|---|
| 10,129,635 B1 * | 11/2018 | Zhu ........................ | H01Q 1/273 |
| 2004/0080458 A1 * | 4/2004 | Sekine .................. | H01Q 9/0442 343/702 |
| 2013/0201061 A1 * | 8/2013 | Chiang ................... | H01Q 1/243 343/893 |
| 2018/0342784 A1 * | 11/2018 | Samardzija ............ | H01Q 1/38 |
| 2019/0379124 A1 * | 12/2019 | Zou ........................ | H01Q 9/065 |

* cited by examiner

*Primary Examiner* — Whitney Moore
(74) *Attorney, Agent, or Firm* — David & Raymond Patent Firm; Raymond Y Chan

(57) ABSTRACT

A half-wave back-folding directional microwave detection antenna includes a half-wave oscillator and a reference ground. The half-wave oscillator has an electrical length greater than or equal to ½ wavelength and less than or equal to ¾ wavelength. The half-wave oscillator is folded back to form a feed point that a distance between two ends of the half-wave oscillator is greater than or equal to $\lambda/128$ and is lesser than or equal to $\lambda/6$. The two ends of the half-wave oscillator are spaced apart from the reference ground with a distance greater than or equal to $\lambda/128$. A distance between at least one end of the half-wave oscillator and the reference ground is lesser than or equal to $\lambda/16$. The two ends of the half-wave oscillator form a phase difference and are coupled to each other, wherein $\lambda$ is wavelength parameter corresponding to frequency of the excitation signal.

26 Claims, 13 Drawing Sheets

HALF-WAVE BACK-FOLDING DIRECTIONAL MICROWAVE DETECTION ANTENNA

CROSS REFERENCE OF RELATED APPLICATION

This is a non-provisional application that claims the benefit of priority under 35U.S.C. § 119 to Chinese applications, application number 2021104589585, filed Apr. 27, 2021, application number 2021217266402, filed Jul. 28, 2021, and application number 2021217266347, filed Jul. 28, 2021, which are incorporated herewith by references in their entirety.

BACKGROUND OF THE PRESENT INVENTION

Field of Invention

The present invention relates to a field of microwave detection, and more particularly to a half-wave back-folding directional microwave detection antenna.

Description of Related Arts

Microwave detection technology is based on the principle of Microwave Doppler Effect, wherein it is configured to detect any movement within a target space for determining whether there is a human body entering and existing in the target space, so as to detect the moving object without invading people's privacy. Therefore, the microwave detection technology can be used in behavior detection and existence detection as important connections between people and things, and among things, and has a wide range of application prospects. Specifically, an excitation signal is fed to the corresponding microwave detection antenna to transmit a microwave beam having a corresponding frequency of the excitation signal to the target space, so as to define a detection area within the target space. The microwave detection antenna will then receive a reflection wave formed by reflecting the microwave beam by a corresponding object in the detection area, and will transmit a reflection signal having a corresponding frequency of the reflection wave to a mixing detection unit. Accordingly, the mixing detection unit is configured to mix the excitation signal and the reflection signal to output a Doppler intermediate frequency signal corresponding to the frequency/phase difference between the excitation signal and the reflection signal. Based on the principle of the Doppler Effect, when the object that reflects the microwave beam is in motion, there will be a frequency/phase difference between the reflection signal and the excitation signal, such that the Doppler intermediate frequency signal presents corresponding amplitude fluctuations as the feedback of human activity.

The existing microwave detection antennas are mainly divided into a microwave detection antenna with a cylindrical radiation source structure and a microwave detection antenna with a flat radiation source structure (also called a patch antenna). Specifically, FIGS. 1A to 1C respectively illustrate the structure principle of the microwave detection antenna 10P with the existing cylindrical radiation source structure, its radiation pattern and S11 curve corresponding to the structural principle. Accordingly, the microwave detection antenna 10P with the cylindrical radiation source structure comprises a cylindrical radiation source 11P and a reference ground 12P, wherein the reference ground 12P is provided with a radiation hole 121P. The cylindrical radiation source 11P is configured to extend from its feed end 111P to vertically penetrate through the reference ground 12P via the radiation hole 121P, wherein a radiation gap 1211P is formed between the radiation hole 121P and the reference ground 12P. The cylindrical radiation source 11P has an electrical length greater than or equal to a quarter wavelength between the end of the cylindrical radiation source 11P opposed to the feeding end 111P and the reference ground 12P, such that the microwave detection antenna 10P of the cylindrical radiation source structure can have a corresponding resonant frequency and have selectivity to the reflection wave. Therefore, it is suitable for microwave detection based on the principle of Doppler Effect. Correspondingly, when the excitation signal is fed to the feeding terminal 111P of the cylindrical radiation source 11P, the cylindrical radiation source 11P can be coupled with the reference ground 12P to form a cylindrical shaped radiation space 100P from the radiation gap 1211P along a center axis of the cylindrical radiation source 11P. The radiation space 100P is defined as the coverage area of electromagnetic wave radiated by the microwave detection antenna 10P of the cylindrical radiation source structure. Under the excitation of the excitation signal, the current density of the end of the columnar radiation source 11P away from the feeding end 111P is the largest. Under a suitable area setting of the reference ground 12P, the boundary of the microwave detection antenna 10P of the cylindrical radiation source structure is the same as the front and rear electromagnetic radiation ranges of the reference ground 12P without having the ability of directional radiation. Furthermore, a detection dead zone is formed in the extending direction of the two ends of the cylindrical radiation source 11P. Corresponding to the radiation space 100P, it has a large backward lobe bounded by the reference ground 12P, and setting the cylindrical radiation source 11P as the central axis, there are concave detection dead zones in the extending direction of the two ends of the cylindrical radiation source 11P.

Furthermore, since the cylindrical radiation source 11P of the microwave detection antenna 10P of the cylindrical radiation source structure is perpendicular to the reference ground 12P thereof, the microwave detection antenna 10P with the cylindrical radiation source structure requires a larger installation space comparing with the microwave detection antenna of the flat-plate radiation source structure. Therefore, for achieving a compact and aesthetic appearance, the microwave detection antenna of the flat-plate radiation source structure is better than that of the cylindrical radiation source structure because of the small space occupation and relative stability. However, since the planar size of the microwave detection antenna of the flat-plate radiation source structure in the direction of its reference ground is directly limited by the area of its reference ground, and the microwave detection antenna of the flat-plate radiation source structure has certain size requirements for its flat-plate radiation source, the area of the reference ground also has certain size requirements based on the area larger than the area of the flat-plate radiation source. Correspondingly, the planar size of the microwave detection antenna of the flat-plate radiation source structure in its reference ground direction is difficult to reduce comparing to the planar size of the microwave detection antenna 10P of the cylindrical radiation source structure in the reference ground direction 12P. In other words, even though the microwave detection antenna of the flat-plate radiation source structure requires smaller installation space comparing to the microwave detection antenna 10P of the cylindrical radiation source structure, the area of the reference ground 12P of the microwave detection antenna 10P of the cylindrical radiation source structure is allowed to be set smaller than the area of the reference ground of the microwave detection antenna of the flat radiation source structure. Corresponding to the installation requirement that there is no need to consider the space occupied by the microwave detection antenna 10P of the cylindrical radiation source structure in the direction of the cylindrical radiation source 11P, the microwave detection antenna 10P of the cylindrical radiation source structure requires a smaller installation space comparing with the microwave detection antenna of the planar radiation source structure. Therefore, the microwave detection antenna 10P with the cylindrical radiation source structure still has widely application requirements.

However, by setting the reference ground 12P as the boundary, the microwave detection antenna 10P of the cylindrical radiation source structure has a relatively large backward lobe. And, by configuring the cylindrical radiation source 11P as the central axis, the concave detection dead zones are formed in the extending direction of the two ends of the cylindrical radiation source 11P. For example, the detection area and the target space may be partially overlapped with each other, such that the target space out of the detection area cannot be effectively detected, and/or there is an environmental interference in the detection area out of the target space. The environmental interference includes motion interference, electromagnetic interference and self-excited interference caused by electromagnetic shielding environment, so as to causes the problem of poor detection accuracy and/or poor anti-interference performance of the microwave detection antenna 10P with the cylindrical radiation source structure. Therefore, the microwave detection antenna 10P with the cylindrical radiation source structure has poor detection stability in practical applications and has limited adaptability to different applications in practical applications.

In addition, by configuring the direction perpendicular to the reference ground 12P as the height direction of the microwave detection antenna 10P of the cylindrical radiation source structure, the height of the cylindrical radiation source 11P is relatively high and there are requirements for the structure of the corresponding microwave detection device of the microwave detection antenna 10P of the cylindrical radiation source structure. Whether it is the microwave detection antenna 10P with the cylindrical radiation source structure or the microwave detection antenna with the flat radiation source structure, the coupling energy forming the radiation space is mainly concentrated between the reference ground and the corresponding radiation source. The resonance stability of the corresponding microwave detection antenna has strict electrical parameter requirements for the medium between the reference ground and the corresponding radiation source, and the reference ground itself. For example, for the microwave detection antenna of the flat-plate radiation source structure, the structural design of the circuit substrate serves as a physical support at a space between the flat-plate radiation source and the reference ground, wherein the circuit substrate is made of expensive high-frequency material in order to meet the electrical parameter requirements of the resonance stability of the microwave detection antenna of the flat-plate radiation source structure for the medium between the flat-plate radiation source and the reference ground. FIG. 2 illustrates the structural configuration of the microwave detection antenna 10P in actual use. For the resonance stability of the corresponding microwave detection antenna 10P, an independent modular structure comprising the reference ground 12P and the corresponding radiation source 11P is set on the main board 20P of the corresponding microwave detection device, wherein at the same time when there are further requirements for the structure of the corresponding microwave detection device, it is disadvantageous for cost control and automated production control.

SUMMARY OF THE PRESENT INVENTION

The invention is advantageous in that it provides a half-wave back-folding directional microwave detection antenna, wherein the half-wave back-folding directional microwave detection antenna has obvious resonance frequency to match with the corresponding target space, to improve the selection of received reflected wave, and to enhance the transmission performance at the resonant frequency point, such that it is suitable for microwave detection based on the principle of Doppler effect.

Another advantage of the invention is to provide a half-wave back-folding directional microwave detection antenna, wherein based on the structural configuration of the microwave detection antenna of the cylindrical radiation source structure, the cylindrical radiation source is bent to configure the far end, which is far away from its feed end, close to the reference ground with a distance range greater than or equal to $\lambda/128$ and lesser than or equal to $\lambda/16$, in order to obtain a deformed structure of the microwave detection antenna of the cylindrical radiation source structure capable of forming directional radiation but incapable of generating obvious resonance frequency points. Accordingly, $\lambda$ is the wavelength parameter corresponding to the frequency of the corresponding excitation signal. Based on the improved deformed structure of the half-wave back-folding directional microwave detection antenna, the features of the microwave detection antenna with the cylindrical radiation source structure in terms of structural form can be maintained, and at the same time, it can form directional radiation and produce obvious resonance frequency points. It can also avoid any formation of detection dead zone in the direction of directional radiation, and is suitable for microwave detection based on the principle of Doppler Effect.

Another advantage of the invention is to provide a half-wave back-folding directional microwave detection antenna, wherein the half-wave back-folding directional microwave detection antenna is able to form directional radiation. Under the same area condition of the reference ground, the gain of the half-wave back-folding directional microwave detection antenna in the directional radiation direction can be multiply increased in response to the microwave detection antenna of the cylindrical radiation source structure, so as to improve the detection distance and detection sensitivity of the half-wave back-folding directional microwave detection antenna.

Another advantage of the invention is to provide a half-wave back-folding directional microwave detection antenna, wherein the half-wave back-folding directional microwave detection antenna has obvious resonance frequency point, has higher Q value at the working frequency point, and has better frequency selection characteristics. In other words, the half-wave back-folding directional microwave detection antenna has better selectivity to the received reflected wave and has a strong anti-interference ability.

Another advantage of the invention is to provide a half-wave back-folding directional microwave detection antenna, wherein the half-wave oscillator is folded back at a position that two ends of the half-wave oscillator are close to each other with a distance range greater than or equal to λ/128 and lesser than or equal to λ/6. When a phase difference is formed between the two ends of the half-wave oscillator based on the corresponding feed structure, the two ends of the half-wave oscillator can be coupled to each other. Then, the two ends of the half-wave oscillator are close to the reference ground at a distance greater than or equal to λ/128, wherein when the half-wave oscillator is set spaced apart from the reference ground at a position that at least one end of the half-wave oscillator is close the reference ground with a distance range lesser than or equal to λ/6, a direct coupling energy between the end of the half-wave oscillator and the reference ground will be reduced. Furthermore, at the same time when forming the directional radiation of the half-wave back-folding directional microwave detection antenna, obvious resonance frequency points are generated based on the coupling between the two ends of the half-wave oscillator, which is beneficial to match with the corresponding target space and to have a selection of the received reflected wave. Therefore, the present invention is configured for the microwave detection based on the principle of Doppler Effect.

Another advantage of the invention is to provide a half-wave back-folding directional microwave detection antenna, wherein at least one end of the half-wave oscillator is close to the reference ground in a distance range greater than or equal to λ/128 and lesser than or equal to λ/6. Under the formation of the directional radiation, the area requirement of the reference ground is reduced, so as to beneficial to the miniaturization of the half-wave back-folding directional microwave detection antenna.

Another advantage of the invention is to provide a half-wave back-folding directional microwave detection antenna, wherein since the two ends of the half-wave oscillator can be coupled to each other, the requirement for the electrical parameters of the reference ground can be reduced under the formation of the directional radiation. In other words, the reference ground allows other components to be installed without affecting the normal operation of the half-wave back-folding directional microwave detection antenna. Therefore, through the setting of installing the corresponding components into the circuit board of the reference ground, a non-modular integrated arrangement of the half-wave back-folding directional microwave detection antenna with the corresponding Doppler microwave detection device is formed. As a result, the size of the Doppler microwave detection device can be reduced, and at the same time, the production process of the Doppler microwave detection device can be simplified, and the material of the Doppler microwave detection device can be reduced.

Another advantage of the invention is to provide a half-wave back-folding directional microwave detection antenna, wherein the half-wave oscillator has an electrical length greater than or equal to ½ and less than or equal to ¾ wavelength, such that it is beneficial to form an inverted phase difference between the two ends of the half-wave oscillator based on the corresponding feeding structure. The energy of coupling the two ends of the half-wave oscillator will be maximized so as to increase the gain of the half-wave back-folding directional microwave detection antenna and to generate obvious resonance frequency point.

Another advantage of the invention is to provide a half-wave back-folding directional microwave detection antenna, wherein the half-wave oscillator has a feed point located toward and close to one end of the half-wave oscillator, wherein the end of the half-wave oscillator close to the feed point is a feed end. The far end of the half-wave oscillator is arranged far away from the reference ground relative to the feed end, i.e. the distance between the far end of the half-wave oscillator and the reference ground is greater than the distance between the feed end and the reference ground. When the half-wave oscillator is fed at the feed point, current density is formed and layering distributed from high to low in the direction from the far end of the half-wave oscillator to the reference ground. It is beneficial to further reduce the energy directly coupled between the two ends of the half-wave oscillator and the reference ground, and to vector overlap the electric field between the two ends of the half-wave oscillator and the electric field between the two ends of the half-wave oscillator and the reference ground, so as to further increase the gain of the half-wave back-folding directional microwave detection antenna and to generate obvious resonance frequency point.

Another advantage of the invention is to provide a half-wave back-folding directional microwave detection antenna, wherein through the loading of the loading branch of the half-wave oscillator, the resonant frequency of the half-wave back-folding directional microwave detection antenna is configured to match the corresponding operating frequency so as to ensure the anti-interference performance of the half-wave back-folding directional microwave detection antenna. Also, it is simple and easy to implement to ensure the consistency and reliability of the half-wave back-folding directional microwave detection antenna in mass production.

Another advantage of the invention is to provide a half-wave back-folding directional microwave detection antenna, which further comprises a feed line, wherein one end of the feed line is electrically connected to the feed point of the half-wave oscillator. The feed line is configured to have an electrical length greater than or equal to 1/128 wavelength and lesser than or equal to ¼ wavelength. When the other end of the feed line is electrically coupled with the corresponding excitation circuit to receive the excitation signal, the half-wave oscillator is fed at the feed point of the half-wave oscillator through the feed line at the feed point where the electrical connection between the half-wave oscillator and the reference ground.

Another advantage of the invention is to provide a half-wave back-folding directional microwave detection antenna, wherein the half-wave oscillator is formed in an elongated columnar shape that the half-wave oscillator is thickened by the feed line. At the same time when tuning the resonant frequency point of the half-wave back-folding directional microwave detection antenna to match the corresponding operating frequency with a thicken design based on the feed line, the supportive strength of the feed line to the half-wave oscillator is improved to enhance the structural stability of the half-wave back-folding directional microwave detection antenna.

Another advantage of the invention is to provide a half-wave back-folding directional microwave detection antenna, wherein the resonance frequency of the half-wave back-folding directional microwave detection antenna is at the half-wave oscillator. Under the limitation of the fixed connection between the loading branch and the feed line, the electrical lengths of the wavelength of the half-wave oscillator, the loading branch and the feed line are determined. Under the unchanged conditions of the electrical lengths of the wavelength of the half-wave oscillator, the loading branch and the feed line, and their connections between each other, the slight deformation of the half-wave oscillator is formed based on the mass production errors and daily use will hardly affect the working parameters of the half-wave back-folding directional microwave detection antenna.

Therefore, the half-wave back-folding directional microwave detection antenna has good consistency and stability.

Another advantage of the invention is to provide a half-wave back-folding directional microwave detection antenna, which further comprises a position limiting base configured to support and/or affix the half-wave oscillator in order to prevent the deformation of the half-wave oscillator during production, assembly and use, and to ensure the structural stability of the half-wave back-folding directional microwave detection antenna.

Another advantage of the invention is to provide a half-wave back-folding directional microwave detection antenna, wherein the half-wave oscillator is supported and/or affixed by the position limiting base based on the corresponding shape of the position limiting base. The loss of the half-wave back-folding directional microwave detection antenna can be reduced via the contact between the position limiting base and the half-wave oscillator, and the medium between the position limiting base and the half-wave oscillator and between the position limiting base and the reference ground, so as to ensure the structural stability and the performance stability of the half-wave back-folding directional microwave detection antenna at the same time.

Another advantage of the invention is to provide a half-wave back-folding directional microwave detection antenna, which further comprises a microstrip transmission line, wherein the microstrip transmission line has one end connected to the fixing end of the feed line and is spaced apart from the reference ground with a distance range of $\lambda/16$ or less. The corresponding impedance is matched based on the length setting of the microstrip transmission line, and at the same time, the loss of the microstrip transmission line is reduced based on the structural configuration that the microstrip transmission line spaced from the reference ground with a distance range less than or equal to $\lambda/16$, so as to ensure the gain of the half-wave back-folding directional microwave detection antenna. When the other end of the microstrip connecting line is electrically coupled with the corresponding excitation circuit to receive the excitation signal, the half-wave oscillator is fed at the feed point of the half-wave oscillator through the feed line at the feed point where the electrical connection between the half-wave oscillator and the reference ground According to the present invention, the foregoing and other objects and advantages are attained by a half-wave back-folding directional microwave detection antenna, comprising:

a half-wave oscillator which has an electrical length greater than or equal to ½ wavelength and less than or equal to ¾ wavelength, wherein the half-wave oscillator is folded back to form a feed point at a position that a distance between two ends of the half-wave oscillator is greater than or equal to $\lambda/128$ and is lesser than or equal to $\lambda/6$, wherein the feed point is offset from one end of the half-wave oscillator and is close to another end thereof, wherein when the half-wave oscillator is fed for receiving an excitation signal at the feed point, the two ends of the half-wave oscillator form a phase difference and are coupled to each other, wherein $\lambda$ is wavelength parameter corresponding to frequency of the excitation signal; and a reference ground, wherein the two ends of the half-wave oscillator are spaced apart from the reference ground with a distance greater than or equal to $\lambda/128$, and a distance between at least one end of the half-wave oscillator and the reference ground is lesser than or equal to $\lambda/6$.

In one embodiment, the end of the half-wave oscillator close to the feed point thereof is defined as a feed end, wherein a distance between the feed end of the half-wave oscillator and the reference ground is lesser than or equal to a distance between the other end of the half-wave oscillator and the reference ground.

In one embodiment, the half-wave back-folding directional microwave detection antenna further comprises a feed line, wherein one end of the feed line is electrically connected to the feed point of the half-wave oscillator and is extended toward the reference ground, wherein the feed line has an electrical length greater than or equal to $\lambda/128$ and lesser than or equal to ¼ wavelength, wherein when another end of the feed line is configured for electrically coupling with an excitation circuit to generate the excitation signal, the half-wave oscillator is fed at the feed point through the feed line.

In one embodiment, the half-wave back-folding directional microwave detection antenna further comprises at least a loading branch electrically connected to the half-wave oscillator between the two ends thereof.

In one embodiment, the half-wave oscillator, having an elongated columnar shape, has two coupling portions extended in the same direction from the two ends and parallel to said reference ground, and a connecting portion extended between the two coupling portions in a direction perpendicular to the reference ground.

In one embodiment, the feed line is thickened in an extension direction of each of the two coupling portions of the half-wave oscillator.

In one embodiment, the half-wave back-folding directional microwave detection antenna further comprises a microstrip transmission line, wherein the end of the feed line far from the feed point is defined as a fixing end, wherein the microstrip transmission line has one end connected to the fixing end of the feed line and is spaced apart from the reference ground with a distance range of $\lambda/16$ or less.

In one embodiment, the microstrip transmission line is configured to extend from the fixing end in the same direction corresponding to the extension direction of the coupling portion.

In one embodiment, the microstrip transmission line is configured to extend from the fixing end in the opposite direction corresponding to the extension direction of the coupling portion.

In one embodiment, at least one loading branch is extended from the connecting portion in a direction toward the reference ground.

In one embodiment, the loading branch is extended from the connecting portion in a direction toward the reference ground to electrically connect to the reference ground.

In one embodiment, a physical length of the coupling portion extending from the feed end of the half-wave oscillator is smaller than a physical length of the other coupling portion, such that the two ends of the half-wave oscillator are interlaced in the direction perpendicular to the reference ground.

In one embodiment, the half-wave back-folding directional microwave detection antenna further comprises a position limiting base which comprises a base, a damper extended from the base, and a half-wave oscillator supporter, wherein the damper is configured to clamp the feed line in order to support and limit the position of the half-wave oscillator, wherein when the feed line is clamped by the damper, the end of the half-wave oscillator supporter is extended to support half-wave oscillator, such that the half-wave oscillator is supported and fixed when the base is fixed.

In one embodiment, when the feed line is clamped by the damper, the end of the half-wave oscillator supporter opposite to the half-wave oscillator has a distance range of $\lambda/16$ to $\lambda/4$ from the feed end.

In one embodiment, the feed point is located at the feed end.

Still further objects and advantages will become apparent from a consideration of the ensuing description and drawings.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It is appreciated that the terms "longitudinal", "transverse", "upper", "lower", "front", "rear", "left", "right", "vertical", "horizontal", "top", "bottom", "interior" and "exterior" in the following description refer to the orientation or positioning relationship in the accompanying drawings for easy understanding of the present invention without limiting the actual location or orientation of the present invention. Therefore, the above terms should not be an actual location limitation of the elements of the present invention.

It is appreciated that the terms "one" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

Referring to FIGS. 3A to 4C of the drawings, based on the structural configuration of the microwave detection antenna 10 with a cylindrical radiation source structure, by bending the cylindrical radiation source 11A of the microwave detection antenna 10A of the cylindrical radiation source structure to locate the far end of the cylindrical radiation source 11A, which is far away from the feed end 111A thereof, close to the reference ground 12A within a distance range greater than or equal to $\lambda/128$ and less than or equal to $\lambda/6$, two deformation structure configurations for the far end far away from the feed end 111A of the bent cylindrical radiation source 11A with the distances $\lambda/6$ and $\lambda/128$ away from the reference ground 12A, the corresponding radiation patterns and S11 curves are shown respectively.

Figure 1A:
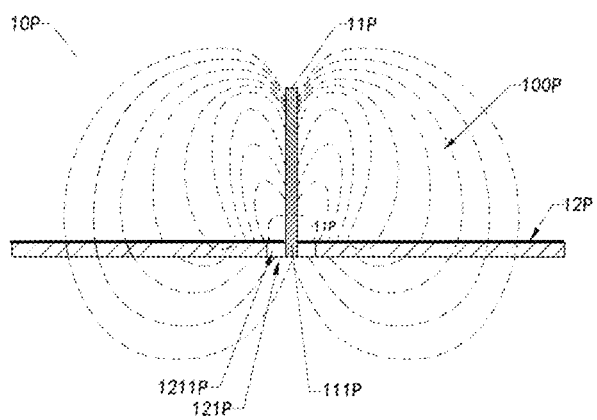
FIG. 1A is a schematic diagram illustrating the structure principle of an existing microwave detection antenna with a cylindrical radiation source structure.
Figure 1B:
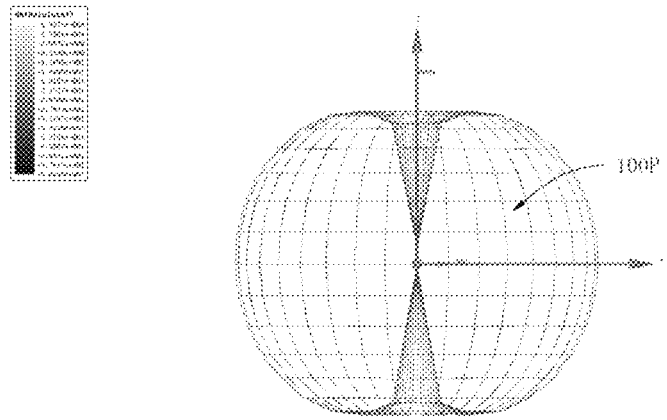
FIG. 1B illustrates a radiation pattern of the existing microwave detection antenna with the cylindrical radiation source structure.
Figure 3A:
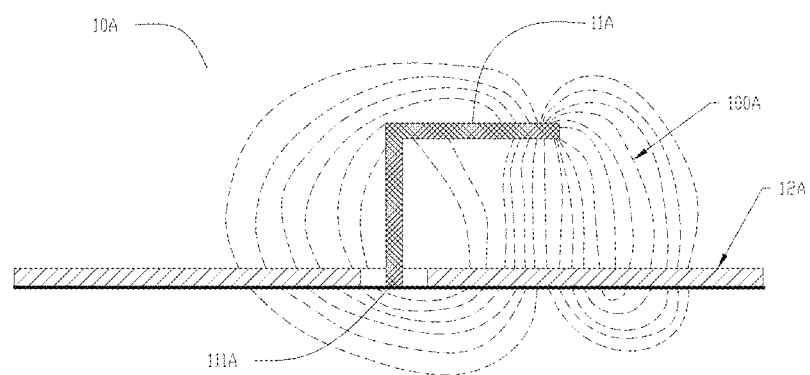
FIG. 3A is a schematic diagram illustrating a modified structure of the microwave detection antenna based on the cylindrical radiation source structure.
Figure 3B:
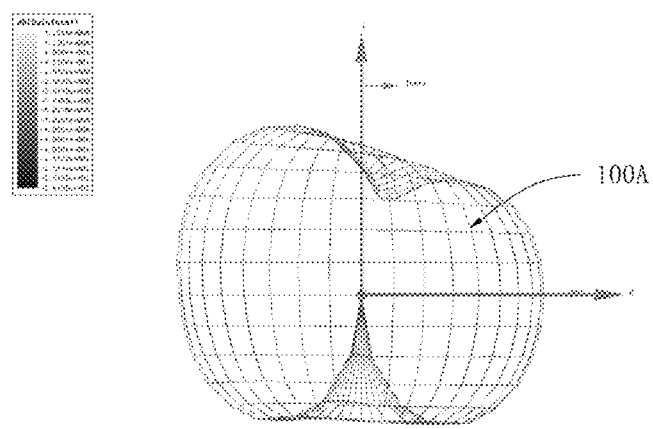
FIG. 3B illustrates a radiation pattern of the modified structure of the microwave detection antenna.
Figure 4A:
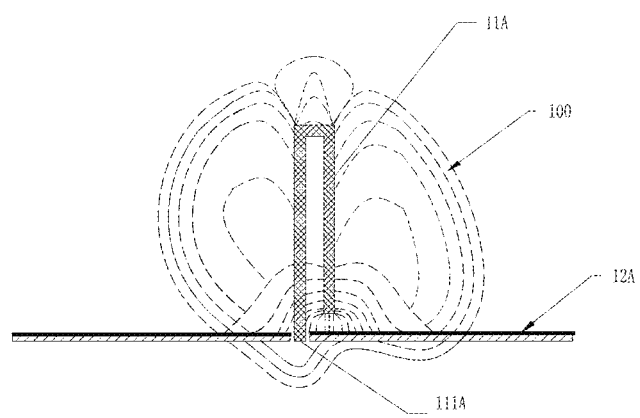
FIG. 4A is a schematic diagram illustrating a second modified structure of the microwave detection antenna based on the cylindrical radiation source structure.
Figure 4B:
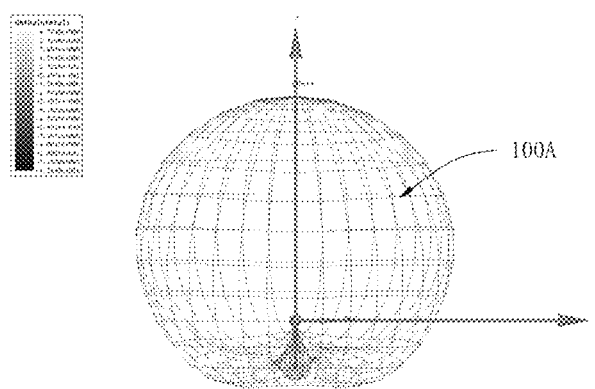
FIG. 4B illustrates a radiation pattern of the second modified structure of the microwave detection antenna.

Comparing to FIGS. 1B, 3B and 4B, as the far end of the cylindrical radiation source 11A away from the feeding end 111A locating close to the reference ground 12A, the backward lobe in the direction away from the cylindrical radiation source 11A is reduced in response to the reference ground 12A as a boundary of the corresponding radiation space 100A. Correspondingly, directional radiation is formed in the direction toward the cylindrical radiation source 11A (the Z-axis direction in the figure) with the reference ground 12A as the boundary. The formation of directional radiation is also accompanied by the increase of the gain in the direction of directional radiation and the disappearance of the radiation dead zone. It is worth mentioning that in the actual application of microwave detection, it is different from the omni-directional radiation requirements of communication antennas. Based on the microwave detection antennas that can only form the directional radiation, it can highly avoid the interference of the actual detection area corresponding to the backward lobe to the forward target detection space, so as to enhance the reliability of the microwave detection.

Figure 1C:
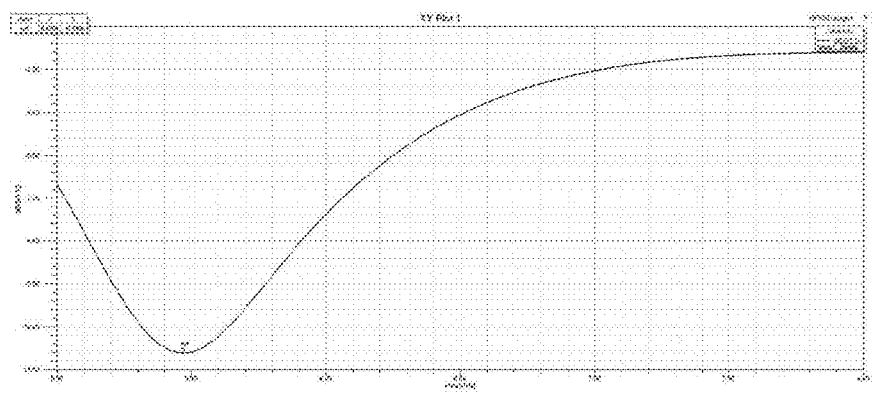
FIG. 1C illustrates a S11 curve of the existing microwave detection antenna with the cylindrical radiation source structure.
Figure 3C:
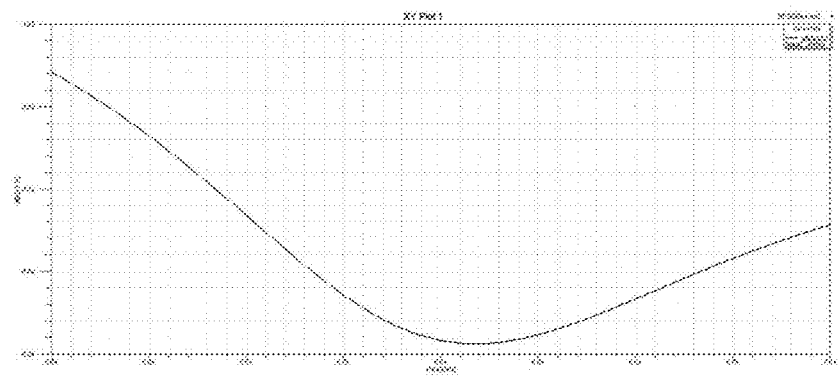
FIG. 3C illustrates the S11 curve of the modified structure of the microwave detection antenna.
Figure 4C:
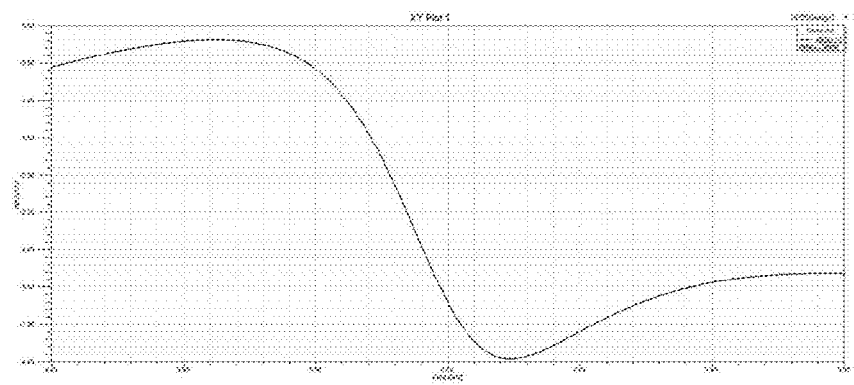
FIG. 4C illustrates the S11 curve of the second modified structure of the microwave detection antenna.

However, based on the comparison of FIGS. 1C, 3C and 4C, it is found that: as the far end of the cylindrical radiation source 11A away from its feed end 111A is getting close to the reference ground 12A, the corresponding S11 curve cannot illustrate the resonance characteristics. In other words, there is no obvious narrow frequency trough in the S11 curve. Accordingly, the lower the trough of the S11 curve, the smaller the loss of the microwave detection antenna at the resonance frequency. The narrower the working bandwidth at the resonance frequency, the better the frequency selection characteristics of the corresponding microwave detection antenna, and the stronger the anti-interference ability. It is worth mentioning that in the actual application of microwave detection, the multi-band communication requirements of the communication antennas are different from the wider operating bandwidth requirements based on data transmission volume/speed requirements, wherein the corresponding microwave detection antennas require the resonance frequency matching the working frequency. Thus, when the resonance frequency point has narrower bandwidth and smaller loss, it can resist the interference of external electromagnetic radiation due to its better frequency selection characteristics, so as to ensure the reliability of microwave detection.

Figure 2:
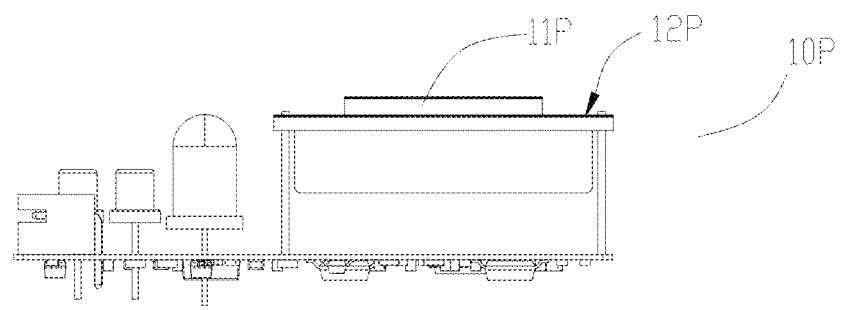
FIG. 2 is a structural diagram of the existing microwave detection antenna which is designed with an independent modular structure installed on the main board of the corresponding microwave detection device.

In other words, as the far end of the cylindrical radiation source 11A away from its feed end 111A is moving close the reference ground 12A, even though the corresponding microwave detection antenna can form directional radiation with the increasing gain in the directional radiation direction and the disappearance of the radiation dead zone, it does not have an obvious resonance frequency suitable for microwave detection. According to the analysis of FIGS. 2A and 3A, it is because the current density of the far end of the cylindrical radiation source 11A far from the feed end 111A is relatively large. as the far end of the cylindrical radiation source 11A away from its feed end 111A is moving close the reference ground 12A, the coupling distance between the far end of the cylindrical radiation source 11A far away from the feed end 111A and the reference ground 12A becomes smaller, which is beneficial to form directional radiation. However, since the coupling between the cylindrical radiation source 11A and the reference ground 12A is too concentrated and the coupling distance is short, the energy distribution of the internal electric field formed by the coupling between the cylindrical radiation source 11A and the reference ground 12A is too concentrated, such that it is difficult to produce obvious resonance frequency points.

In view of the above mentioned deformation configuration, the present invention provides a half-wave back-folding directional microwave detection antenna as an improvement of the above mentioned deformation structure in order to keep the advantages of the cylindrical radiation source structure of the microwave detection antenna 10A in the structural form, and at the same time to form the directional radiation for producing obvious resonance frequency points, and to avoid the formation of detection dead zone in the direction of directional radiation. Therefore, the present invention is configured for the microwave detection based on the principle of Doppler Effect.

Figure 5A:
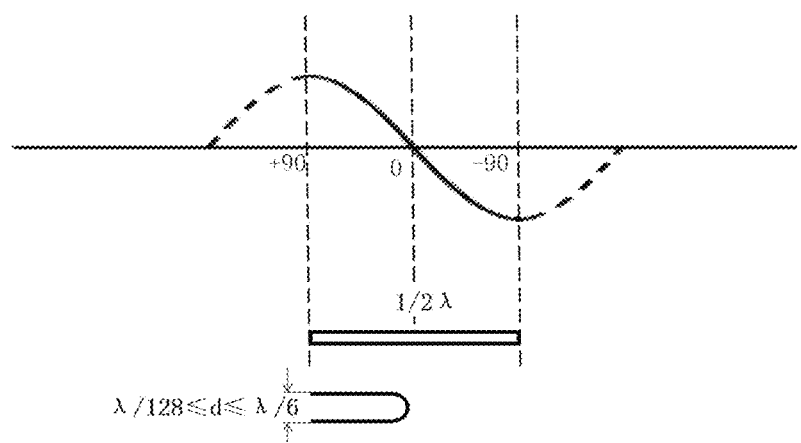
FIG. 5A is a schematic diagram illustrating the phase distribution principle of the half-wave back-folding directional microwave detection antenna when it is fed according to the present invention.
Figure 5B:
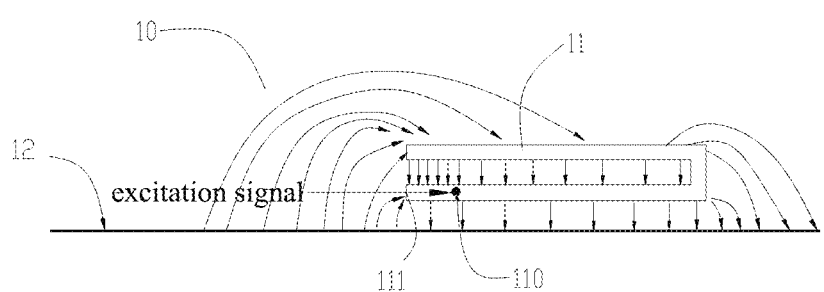
FIG. 5B is a schematic diagram illustrating the structure of the half-wave back-folding directional microwave detection antenna in a corresponding feeding mode according to the present invention.

Accordingly, FIGS. 5A and 5B of the drawings respectively illustrate the phase distribution of the half-wave back-folding directional microwave detection antenna 10 when it is fed and its structural principle under the corresponding feeding mode. The half-wave back-folding directional microwave detection antenna 10 comprises at least a half-wave oscillator 11 and a reference ground 12, wherein the half-wave oscillator 11 is folded back to form a state that a distance between two ends of the half-wave oscillator 11 are close to each other with a distance range greater than or equal to $\lambda/128$ and less than or equal to $\lambda/6$, such that when a phase difference is formed between the two ends of the half-wave oscillator 11 based on the corresponding feeding structure, the two ends of the half-wave oscillator 11 are adapted to be coupled to each other and to have relatively high coupling energy. Then, the two ends of the half-wave oscillator 11 are close to the reference ground 12 at a distance greater than or equal to $\lambda/128$. When the half-wave oscillator 11 is set spaced apart from the reference ground 12 at a position that at least one end of the half-wave oscillator 11 is close to the reference ground 12 within a distance range of lesser than or equal to $\lambda/6$, a direct coupling energy between the end of the half-wave oscillator 11 and the reference ground 12 will be reduced. Furthermore, at the same time when forming the directional radiation of the half-wave back-folding directional microwave detection antenna 10, obvious resonance frequency points are generated based on the coupling between the two ends of the half-wave oscillator 11, which is beneficial to match with the corresponding target space and to have a selection of the received reflected wave. Therefore, the present invention is configured for the microwave detection based on the principle of Doppler Effect.

Furthermore, as shown in FIG. 5A, the half-wave oscillator 11 has an electrical length greater than or equal to $\frac{1}{2}$ and less than or equal to $\frac{3}{4}$ wavelength, such that it is beneficial to form an inverted phase difference between the two ends of the half-wave oscillator 11 based on the corresponding feeding structure. When the half-wave oscillator 11 is folded back in a state where the two ends thereof are close to each other within a distance range greater or equal to $\lambda/128$, and lesser or equal to $\lambda/6$, the energy of coupling the two ends of the half-wave oscillator 11 will be maximized so as to increase the gain of the half-wave back-folding directional microwave detection antenna 10 and to generate obvious resonance frequency point.

It is worth mentioning that at least one end of the half-wave oscillator 11 is close to the reference ground 12 within a distance range greater than or equal to $\lambda/128$ and lesser than or equal to $\lambda/6$. Under the formation of the directional radiation, the area requirement of the reference ground 12 is reduced, so as to beneficial to the miniaturization of the half-wave back-folding directional microwave detection antenna 10.

Furthermore, the half-wave oscillator 11 is folded back in a state that where its two ends are close to each other within a distance range greater or equal to $\lambda/128$, and lesser or equal to $\lambda/6$, and the two ends of the half-wave oscillator 11 are close to the reference range greater than or equal to $\lambda/128$, and at least one end of the half-wave oscillator 11 is closed to the reference range less than or equal to $\lambda/16$, it can be perpendicular to the reference ground 12 in a height direction. The height of the half-wave back-folding directional microwave detection antenna 10 can be substantially reduced comparing to the existing microwave detection antenna 10A of the cylindrical radiation source structure. Therefore, it is further beneficial to the miniaturization of the half-wave back-folding directional microwave detection antenna 10.

Furthermore, as shown in FIG. 5B, the half-wave oscillator 11 has a feed point 110, wherein the feed point 110 is located toward and close to one end of the half-wave oscillator 11. Accordingly, the end of the half-wave oscillator 11 close to the feed point 110 is a feed end 111. Based on the electrical length setting of the half-wave oscillator 11 is greater than or equal to $\frac{1}{2}$ and less than or equal to $\frac{3}{4}$ wavelength, and the ends of the half-wave oscillator 11 are close to each other within a distance range greater than or equal to $\lambda/128$ and less than or equal to $\lambda/16$, the two ends of the half-wave oscillator 11 can be coupled to each other to have relatively high coupling energy.

Preferably, the far end of the half-wave oscillator 11 is arranged far away from the reference ground 12 relative to the feed end 111, i.e. the distance between the far end of the half-wave oscillator 11 and the reference ground 12 is greater than the distance between the feed end 111 and the reference ground 12. Therefore, when the half-wave oscillator 11 is fed at the feed point 110, current density is formed and layering distributed from high to low in the direction from the far end of the half-wave oscillator 11 to the reference ground 12. It is beneficial to further reduce the energy directly coupled between the two ends of the half-wave oscillator 11 and the reference ground 12, and to vector overlap the electric field between the two ends of the half-wave oscillator 11 and the electric field between the two ends of the half-wave oscillator 11 and the reference ground 12, so as to further increase the gain of the half-wave back-folding directional microwave detection antenna 10 and to generate obvious resonance frequency point.

It is worth mentioning that since the two ends of the half-wave oscillator 11 can be coupled to each other, the requirement for the electrical parameters of the reference ground 12 can be reduced under the formation of the directional radiation. In other words, the reference ground 12 allows other components to be installed without affecting the normal operation of the half-wave back-folding directional microwave detection antenna 10. Therefore, through the setting of installing the corresponding components into the circuit board of the reference ground 12, a non-modular integrated arrangement of the half-wave back-folding directional microwave detection antenna 10 with the corresponding Doppler microwave detection device is formed. As a result, the size of the Doppler microwave detection device can be reduced, and at the same time, the production process of the Doppler microwave detection device can be simplified and the material of the Doppler microwave detection device can be reduced.

Figure 6:
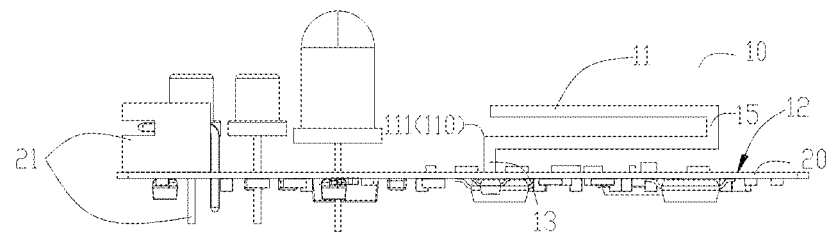
FIG. 6 is a schematic diagram of a non-modular integrated structure of the half-wave reflex directional microwave detection antenna corresponding to Doppler microwave detection device according to an embodiment of the present invention.

Accordingly, as shown in FIG. 6 of the drawings, based on the design of the non-modular design of the half-wave back-folding directional microwave detection antenna 10, the non-modular integrated form of the half-wave back-folding directional microwave detection antenna 10 and the corresponding Doppler microwave detection device is illustrated. The half-wave back-folding directional microwave detection antenna 10 is integrated with the Doppler microwave detection device in a non-modular form to form a de-modular design of the antenna structure of the Doppler microwave detection device. At the same time when the size of the Doppler microwave detection device is reduced, it is beneficial to simplify the production process of the Doppler microwave detection device and reduce the material for the Doppler microwave detection device. Therefore, the production cost of the Doppler microwave detection device can be reduced.

Particularly, the Doppler microwave detection device comprises the half-wave back-folding directional microwave detection antenna 10, and a main circuit board 20 loading with a main circuit 21 of the Doppler microwave detection device. The reference ground 12 of the half-wave back-folding directional microwave detection antenna 10 is loaded on the main circuit board 20 via a copper overlapping layer. The half-wave oscillator 11 is coupled at the main circuit board 20 in an electrical connection form of an electrical coupling of the main circuit 21. Therefore, the half-wave back-folding directional microwave detection antenna 10 is integrated with the Doppler microwave detection device in a non-modular form.

It is worth mentioning that, according to one embodiment of the present invention, the half-wave back-folding directional microwave detection antenna 10 is formed at a space corresponding to the side of the main circuit board 20 where the reference ground 12 is located. In another embodiment, the half-wave back-folding directional microwave detection antenna 10 is formed at a space corresponding to the opposed side of the main circuit board 20 where the reference ground 12 is located. In other words, the main circuit board 20 is spaced between the half-wave oscillator 11 and the reference ground 12, and it should not be limited in the present invention.

It should be understood that for the existing microwave detection antennas with cylindrical radiation source structure and microwave detection antennas with flat radiation source structure, even though by highly increasing the area size of the main circuit board of the corresponding microwave detection device to form a de-modularized integrated form of the existing microwave detection antenna and the main circuit board of the corresponding microwave detection device, the material requirement of the circuit board of the corresponding microwave detection device must match with these of the corresponding microwave detection antenna. In other words, the de-modularized integration form of the existing microwave detection antenna and the main circuit board of the corresponding microwave detection device will increase the size of the corresponding microwave detection device and will increase the material cost of the corresponding microwave detection device.

Figure 7A:
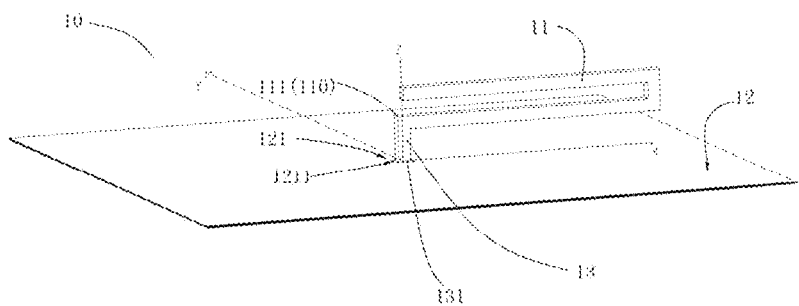
FIG. 7A is a schematic diagram of the structure of the half-wave back-folding directional microwave detection antenna according to the above preferred embodiment of the present invention.
Figure 7B:
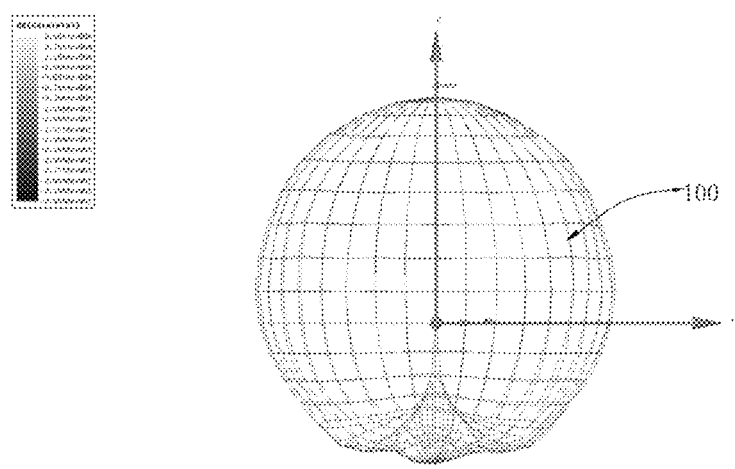
FIG. 7B illustrates a radiation pattern of the half-wave back-folding directional microwave detection antenna according to the above preferred embodiment of the present invention.
Figure 7C:
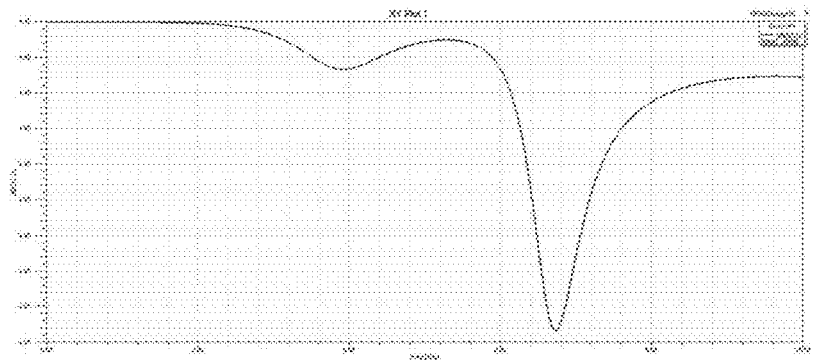
FIG. 7C illustrates a S11 curve of the half-wave back-folding directional microwave detection antenna according to the above preferred embodiment of the present invention.

Furthermore, as shown in FIGS. 7A to 7C of the drawings, based on the structural principle in the feeding mode shown in FIG. 5B, the three-dimensional structure, the radiation pattern and S11 curve of the half-wave back-folding directional microwave detection antenna 10 are illustrated respectively according to the above preferred embodiment of the present invention. According to the preferred embodiment, the feed point 110 is located at the feed end 111. The half-wave back-folding directional microwave detection antenna 10 further comprises at least one feed line 13, wherein the number of feed line 13 matches with the number of the half-wave oscillator 11. The feed line 13 has one end electrically connected to the feed point 110 of the half-wave oscillator 11 and an opposed fixing end 131 extended toward the reference ground 12. The reference ground 12 has an isolation slot 121, wherein the fixing end 131 of the feed line 13 is extended through the reference ground 12 via the isolation slot 121 to define an isolation gap 1211 from the reference ground 12 and to electrically isolate from the reference ground 12 via the physical structure. In the state when the fixing end 131 of the feed line 13 is coupled to the corresponding excitation circuit to feed the excitation signal, the half-wave oscillator 11 is fed at the feeding end 111 and is set apart from the reference ground 12 via the electrical connection between the feed line 13 and the feed end 111 of the half-wave oscillator 11 and the physical support for the half-wave oscillator 11.

Particularly, according to the preferred embodiment of the present invention, the feed line 13 and the half-wave oscillator 11 is integrally configured, wherein the feed line 13 is integrally extended to the feed end 111 of the half-wave oscillator 11. As it is mentioned above, the structural configurations of the half-wave oscillator 11 are defined as "the half-wave oscillator has an electrical length greater than or equal to ½ and less than or equal to ¾ wavelength", "the two ends of the half-wave oscillator 11 are close to each other within a distance range greater than or equal to $\lambda/128$ and less than or equal to $\lambda/6$", and "the two ends of the half-wave oscillator 11 are close to the reference ground 12 in a distance range greater than or equal to $\lambda/128$, and at least one end of the half-wave oscillator 11 is close to the reference ground 12 within a distance range of $\lambda/6$ or less to set apart from the reference ground 12". In the state where the feed line 13 is electrically connected to the feed end 111 of the half-wave oscillator 11, the feed end 111 of the half-wave oscillator 11 should not be unique. In other words, the feed end 111 can be located at different positions of the half-wave oscillator 11.

Therefore, it is worth mentioning that, the feed line 13 is electrically connected to the feed end 111 of the half-wave oscillator 11. Taking another end of the half-wave oscillator 11 as a free end, when the position of the feed end 111 of the half-wave oscillator 11 fulfill the above mentioned requirements, the two ends of the half-wave oscillator 11 can be coupled to each other to have relatively high coupling energy, such that the half-wave back-folding directional microwave detection antenna 10 is formed to generate an obvious resonance frequency based on the coupling between the two ends of the half-wave oscillator 11.

Preferably, according to the preferred embodiment of the present invention, the feed line 13 is configured to have an electrical length less than or equal to ¼ wavelength to reduce the coupling between the feeder 13 and the reference ground 12 and to ensure the electric field energy distribution formed by the coupling of the half-wave oscillator 11 itself and the reference ground 12 which is different from the microwave detection antenna 10A of the cylindrical radiation source structure. Furthermore, it is beneficial to form the directional radiation and the obvious resonance frequency, to increase the gain of the half-wave back-folding directional microwave detection antenna 10, and to avoid the formation of the detection dead zone in the direction of the directional radiation.

Furthermore, the feed line 13 is configured to have an electrical length greater than or equal to 1/128 wavelength, such that the half-wave oscillator 11 is supported in the air as a medium and is physically supported at the feed line 13. The half-wave oscillator 11 is formed and configured where the ends of the half-wave oscillator 11 are spaced apart from the reference ground 12 in a distance range of λ/128 or more.

Particularly, in this embodiment of the present invention, the far end of the half-wave oscillator 11 is set far from the reference ground 12 relative to the feed end 111. In other words, the distance between the feed end 111 of the half-wave oscillator 11 and the reference ground 12 is smaller than the distance between the far end and the reference ground 12. Specifically, the far end of the half-wave oscillator 11 is set to be away from the reference ground 12 with respect to the feed end 111, wherein two ends of the half-wave oscillator 11 are aligned in a direction perpendicular to the reference ground 12. In other words, the connecting line of the two ends of the half-wave oscillator 11 is perpendicular to the reference ground 12. Therefore, the current density is formed at the half-wave oscillator 11 and is the laying distributed from high to low from the far end of the half-wave oscillator 11 to the direction of the reference ground 12 while an electric field is formed to vector overlap the electric field between the two ends of the half-wave oscillator 11 and the electric field between the two ends of the half-wave oscillator 11 and the reference ground 12, so as to further increase the gain of the half-wave back-folding directional microwave detection antenna 10 and to generate an obvious resonance frequency point.

As shown in FIGS. 7B and 7C of the drawings, with respect to FIG. 1B, the backward lobe (as an opposite direction of Z axis) in a radiation space 100 of the half-wave back-folding directional microwave detection antenna 10 as a boundary of the reference ground is reduced, and the radiation gain in the direction toward the half-wave oscillator 11 (as the direction of the Z-axis) as the boundary of the reference ground 12 is significantly increased (about 6.4 dB), so as to obviously form the directional radiation as the boundary of the reference ground 12 in the direction toward the half-wave oscillator 11. Comparing to FIG. 1C, even though the S11 curve of the half-wave back-folding directional microwave detection antenna 10 shows relatively higher loss in each frequency band, there clearly shows a narrow wave trough near 6.8 GHz. In other words, the half-wave back-folding directional microwave detection antenna 10 according to the preferred embodiment of the present invention shows obvious resonance characteristics and allows being tuned based on the corresponding tuning structure.

Figure 8A:
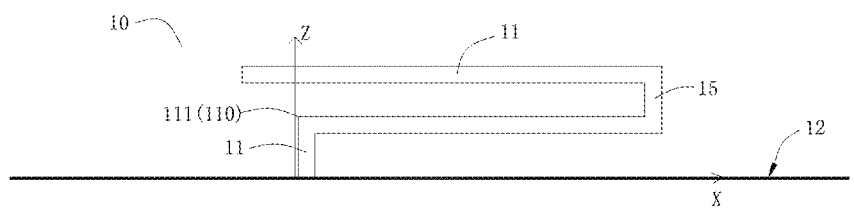
FIG. 8A is a schematic diagram illustrating a tuning structure of the half-wave folding directional microwave detection antenna according to the above-mentioned embodiment of the present invention.
Figure 8B:
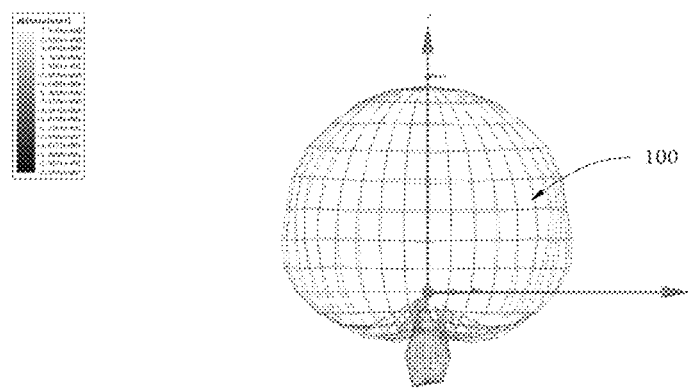
FIG. 8B illustrates a radiation pattern of the tuning structure of the half-wave back-folding directional microwave detection antenna according to the above preferred embodiment of the present invention.
Figure 8C:
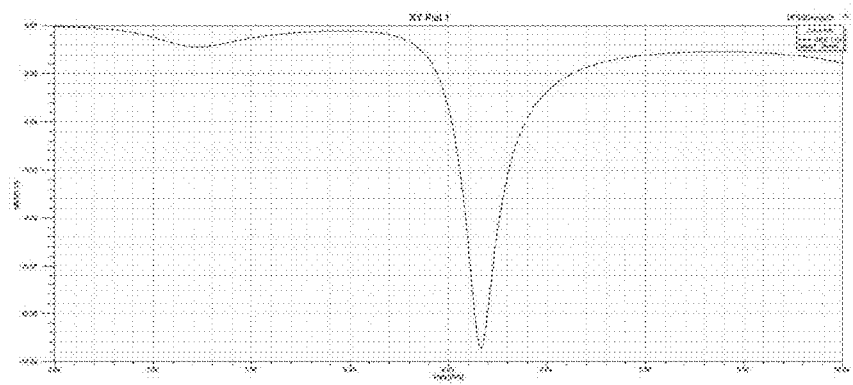
FIG. 8C illustrates a S11 curve of the tuning structure of the half-wave back-folding directional microwave detection antenna according to the above preferred embodiment of the present invention.

Furthermore, as shown in FIGS. 8A to 8C of the drawings, based on FIG. 7A, a tuning structure of the half-wave back-folding directional microwave detection antenna 10 is illustrated. Different from the tuning structure of the half-wave back-folding directional microwave detection antenna 10 as shown in FIG. 7A, the two ends of the half-wave oscillator 11 are interlaced in the direction perpendicular to the reference ground 12. Specifically, taking the feed end 111 of the half-wave oscillator 11 as a reference end, the far end of the half-wave oscillator 11 is offset in the extension direction, such that two ends of the half-wave oscillator 11 are interlaced in the direction perpendicular to the reference ground 12. The distance between the two ends of the half-wave oscillator 11 will be fine-adjusted or fine-tuned under the condition of "the two ends of the half-wave oscillator 11 are close to each other within a distance range greater than or equal to λ/128, and lesser than or equal to λ/6", so as to adjust the shape of the half-wave oscillator 11.

As shown in FIGS. 8B and 8C, comparing to FIGS. 7B and 7C, the two ends of the half-wave oscillator 11 are interlaced in the direction perpendicular to the reference ground 12. The resonance frequency of the half-wave back-folding directional microwave detection antenna 10 is adjusted relative to the half-wave back-folding directional microwave detection antenna 10 shown in FIG. 7A. Comparing to the half-wave back-folding directional microwave detection antenna 10 as shown in FIG. 7A, it has a significantly improved radiation gain in the directional radiation direction. In other words, the two ends of the half-wave oscillator 11 are aligned in the direction perpendicular to the reference ground 12 corresponding to FIG. 7A. Taking the feed end 111 of the half-wave oscillator 11 as a reference end, the far end of the half-wave oscillator 11 is offset in a range in the extension direction, so as to effectively increase the radiation gain of the half-wave back-folding directional microwave detection antenna 10 in the directional radiation direction.

Figure 9A:
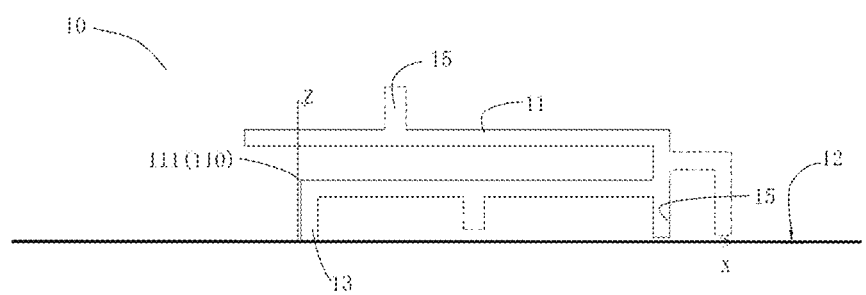
FIG. 9A is a schematic diagram of a first alternative tuning structure of the half-wave back-folding directional microwave detection antenna according to the above preferred embodiment of the present invention.
Figure 9B:
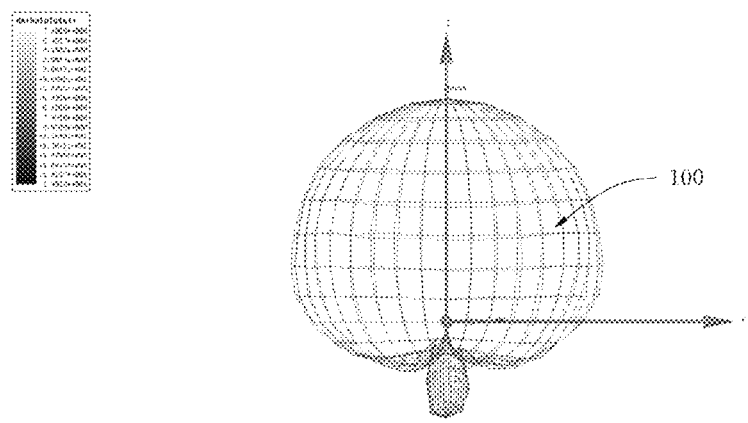
FIG. 9B illustrates a radiation pattern of the first alternative tuning structure of the half-wave back-folding directional microwave detection antenna according to the above preferred embodiment of the present invention.
Figure 9C:
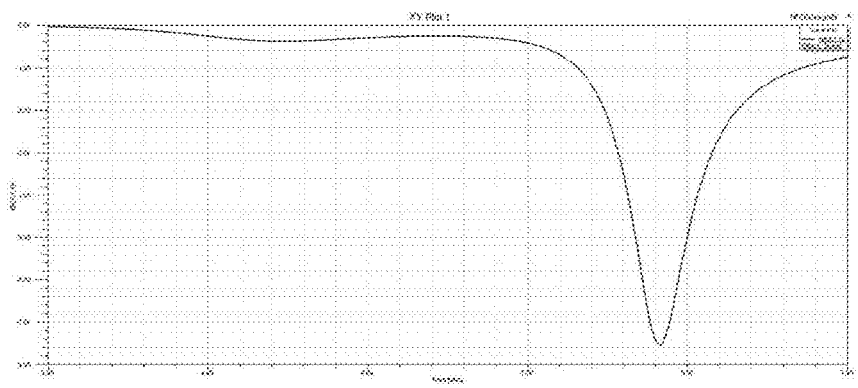
FIG. 9C illustrates an S11 curve of the first alternative tuning structure of the half-wave back-folding directional microwave detection antenna according to the above preferred embodiment of the present invention.

Referring to FIGS. 9A to 9C of the drawings, based on FIG. 8A, a tuning structure of the half-wave back-folding directional microwave detection antenna 10 is illustrated. In the tuning structure of the present invention, the half-wave back-folding directional microwave detection antenna 10 further comprises at least one loading brand 15, wherein the loading brand 15 is loaded on the half-wave oscillator 11. Based on the setting of the electrical length of the wavelength of the loading brand 15 and the adjustment of the position loading of the half-wave oscillator 11, the resonant frequency of the half-wave back-folding directional microwave detection antenna 10 can be adjusted to match with the corresponding operating frequency. The number, shape, electrical length of the wavelength and load position of the branch load 15 can be varied and should not be limited in the present invention.

In detail, in the tuning structure of the present invention, one example shows the tuning operation of 5.8 GHz ISM operating frequency band. The two ends of the half-wave oscillator 11 are interlaced in the direction perpendicular to the reference ground 12 corresponding to FIG. 8A. Furthermore, one end of the loading branch 15 is electrically connected to a position of the half-wave oscillator 11 toward the feed end 111, such that the loading branch 15 is loaded on the half-wave oscillator 11 at a position offset to the feed end 111.

Based on the tuning structure of the present invention, as shown in FIGS. 9B and 9C, comparing to FIGS. 8B and 8C, the tuning structure of the present invention is able to configure to match between the resonant frequency point of the half-wave back-folding directional microwave detection antenna 10 and the 5.8 GHz ISM operating frequency band, so as to further improve the radiation gain in the direction of directional radiation.

It is worth mentioning that, based on the structure of the half-wave back-folding directional microwave detection antenna 10 shown in FIG. 9A, the half-wave back-folding directional microwave detection antenna 10 shows the obvious resonance characteristics and allows to be tuned based on the corresponding tuning structure. The tuning method of the half-wave back-folding directional microwave detection antenna 10 includes, but is not limited to, an adjustment of the electrical length of the half-wave oscillator 11 and an adjustment of the electrical length of the feeder 13, and an adjustment of the number, shape, electrical length and load position of the loading load 15 based on the setting of the loading load 15. Therefore, based on the structural configuration of the half-wave back-folding directional microwave detection antenna 10 as shown in FIG. 5B, under the conditions of "the half-wave oscillator has an electrical length greater than or equal to ½ and less than or equal to ¾ wavelength", "the two ends of the half-wave oscillator 11 are close to each other within a distance range greater than or equal to λ/128 and less than or equal to λ/6", and "the two ends of the half-wave oscillator 11 are close to the reference ground 12 in a distance range greater than or equal to λ/128, and at least one end of the half-wave oscillator 11 is close to the reference ground 12 within a distance range of λ/6 or less to set apart from the reference ground 12", the half-wave oscillator 11 can shows obvious resonance characteristics in various shapes and can be adapted to different shape requirements. Also, it is able to form the resonance frequency point of the half-wave back-folding directional microwave detection antenna 10 to match with the working frequency point based on the corresponding tuning configuration including, but not limited to 5.8 GHz, 10.525 GHz, 24.15 GHz, 60-62 GHz and 77-79 GHz ISM frequency band operating frequency.

Figure 10A:
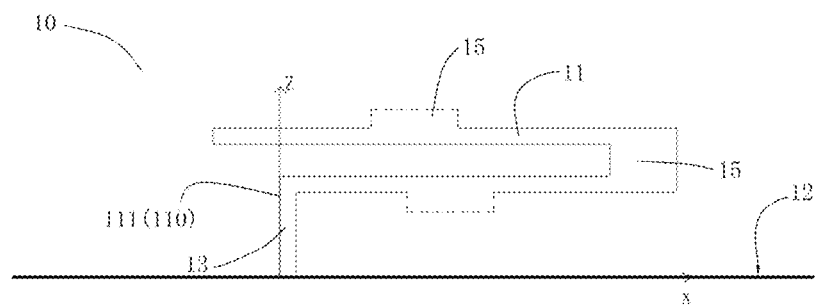
FIG. 10A is a schematic diagram of a second alternative tuning structure of the half-wave back-folding directional microwave detection antenna according to the above preferred embodiment of the present invention.
Figure 10B:
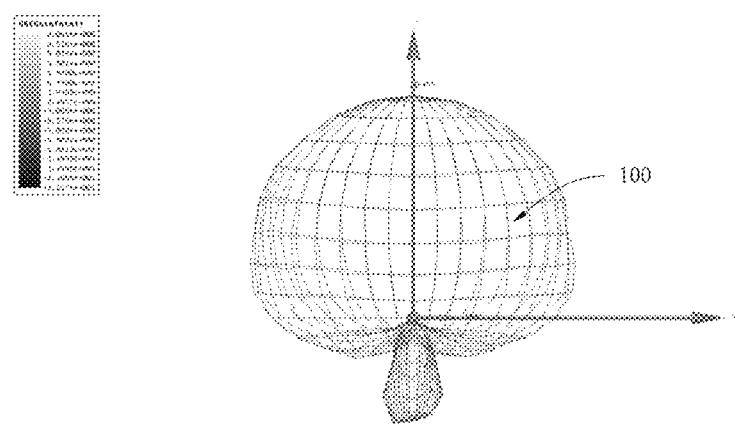
FIG. 10B illustrates a radiation pattern of the second alternative tuning structure of the half-wave back-folding directional microwave detection antenna according to the above preferred embodiment of the present invention.
Figure 10C:
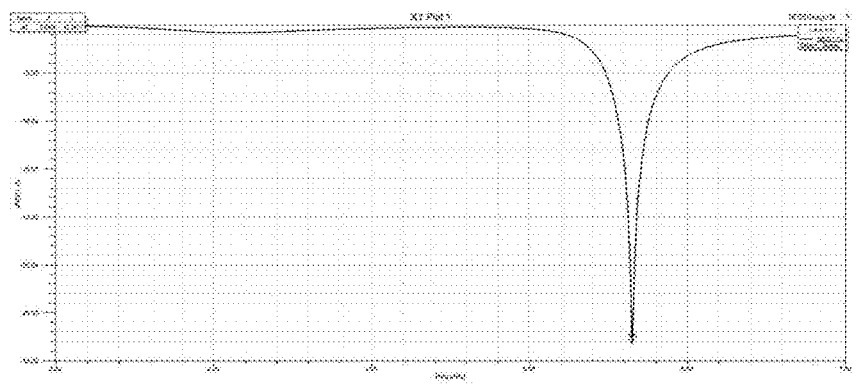
FIG. 10C illustrates an S11 curve of the second alternative tuning structure of the half-wave back-folding directional microwave detection antenna according to the above preferred embodiment of the present invention.

Referring to FIGS. 10A to 10C of the drawings, as the same example showing the tuning operation of 5.8 GHz ISM operating frequency band, by further tuning the loading brand 15, a second tuning structure of the half-wave back-folding directional microwave detection antenna 10 is illustrated based on FIG. 8A. Accordingly, the tuning structure of the corresponding half-wave back-folding directional microwave detection antenna 10 is shown in FIG. 9A, wherein in the tuning structure of the present invention, the loading brand 15 is loaded on the half-wave oscillator 11 at a position offset from the feed end 111 of the half-wave oscillator 11. The loading brand 15 also has a block shape, such that a portion of the half-wave oscillator 11 where the loading brand 15 is loaded thereon is thickened.

Referring to FIGS. 10B and 10C of the drawings, based on the half-wave back-folding directional microwave detection antenna 10, the back radiation with a boundary of the reference ground is significantly weakened and has good directional radiation characteristics. It also has a radiation gain of up to 8 dB in the direction of directional radiation. At the same time, the S11 curve of the half-wave back-folding directional microwave detection antenna 10 shows obvious resonance characteristics, and has a lower loss (less than −30 dB) resonant frequency and a narrower bandwidth at the resonant frequency. Therefore, it has excellent performance for microwave detection and has good anti-interference performance and high sensitivity and reliability.

Figure 11A:
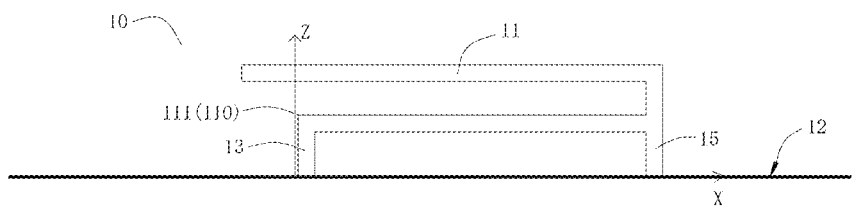
FIG. 11A is a schematic diagram of a third alternative tuning structure of the half-wave back-folding directional microwave detection antenna according to the above preferred embodiment of the present invention.
Figure 11B:
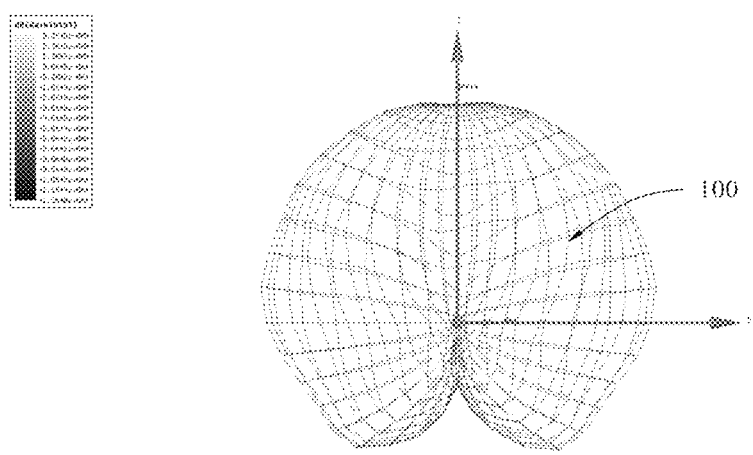
FIG. 11B illustrates a radiation pattern of the third alternative tuning structure of the half-wave back-folding directional microwave detection antenna according to the above preferred embodiment of the present invention.
Figure 11C:
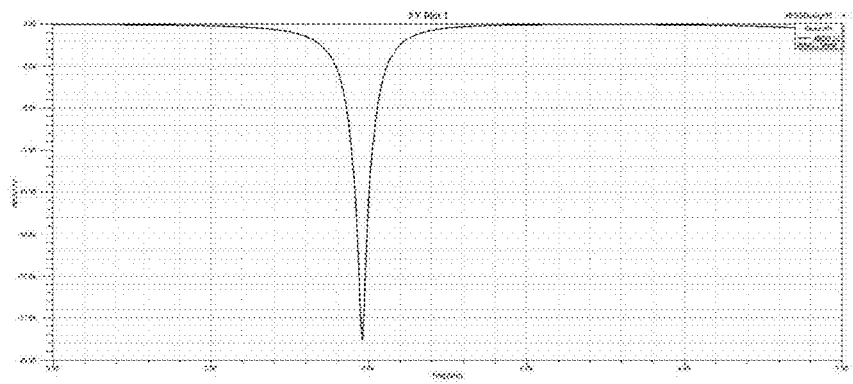
FIG. 11C illustrates an S11 curve of the third alternative tuning structure of the half-wave back-folding directional microwave detection antenna according to the above preferred embodiment of the present invention.

Further referring to FIGS. 11A to 11C of the drawings, through the further tuning of the loading branch 15, the further tuning structure of the half-wave back-folding directional microwave detection antenna 10 is illustrated based on FIG. 9A. In the tuning structure of the present invention, through the combination of different tuning configurations for the loading branch 15, the combination is configured to tune the shape, the electrical length of the wavelength, the load position and the electrical connection relationship of the loading branch 15, so as to form the tuning structure of the half-wave back-folding directional microwave detection antenna 10 as shown in FIG. 11A. In the tuning structure of the present invention, one end of the loading branch 15 is electrically coupled to the half-wave oscillator 11 at a position offset from the feed end 111 of the half-wave oscillator 11. In other words, the loading position of the loading branch 15 is located at the position of the half-wave oscillator 11 offset from the feed end 111, and another end of the loading branch 15 is electrically coupled to the reference ground 12 at the same time.

Referring to FIGS. 11B and 11C of the drawings, the electrical connection between the loading branch 15 and the reference ground 12 reduces the impedance of the half-wave back-folding directional microwave detection antenna 10 at the resonance frequency to improve the quality factor (Q value) of the half-wave back-folding directional microwave detection antenna 10, so as to narrow the frequency bandwidth of the half-wave back-folding directional microwave detection antenna 10 at the resonance frequency (specifically based on the comparison between FIGS. 11C and 9C and between FIGS. 11C and 10C). It is further beneficial to improve the anti-interference performance of the half-wave back-folding directional microwave detection antenna 10. However, since a center region of the half-wave oscillator 11 is close to zero electric potential during the half-wave oscillator 11 is fed (corresponding to FIG. 5A), when the loading position of the loading branch 15 is offset to the feed end 111, the electrical connection between the loading branch 15 and the reference ground 12 not only reduces the electric field energy distribution formed by the coupling between the half-wave oscillator 11 itself and the reference ground 12, but also reduces the radiation efficiency of the half-wave back-folding directional microwave detection antenna 10. Correspondingly to the reduction of the directional radiation gain of the half-wave back-folding directional microwave detection antenna 10 (specifically based on the comparison between FIGS. 11B and 9B and between FIGS. 11B and 10B), the microwave detection antenna 10A with a cylindrical radiation source structure can still form directional radiation and has a relatively high radiation gain in the directional radiation direction. The S11 curve of the half-wave back-folding directional microwave detection antenna 10 not only shows obvious resonance characteristics but also has a lower loss resonance frequency point and a narrower bandwidth at the resonance frequency point, so as to enhance the anti-interference performance.

It is worth mentioning that in the tuning structure of the half-wave back-folding directional microwave detection antenna 10 of the present invention, the electrical length setting for the feed line 13 is formed based on the configuration of the feed line 13. When the distance range is maintained between the feed end 111 of the half-wave oscillator 11 and the reference ground 12, the feeder line 13 in a bent form can be extended to lengthen in the direction toward the reference ground 12, so as to further tune the half-wave back-folding directional microwave detection antenna 10. Thus, based on the loss from the coupling between the feed line 13 and the reference ground 12 and along with the fine-tuning of the radiation efficiency of the half-wave back-folding directional microwave detection antenna 10, the half-wave back-folding directional microwave detection antenna 10 has good directional radiation characteristics and has a higher radiation gain in the directional radiation direction. At the same time based on setting different lengths and shapes of the feed line 13, the resonant frequency point of the half-wave back-folding directional microwave detection antenna 10 can match with the working frequency point thereof.

Referring to FIGS. 12A to 12E of the drawings of the present invention, as an example of tuning with the ISM operating frequency band of 5.8 GHz, through the future tuning of the loading load 15 and the feed line 13, another preferred tuning structure of the half-wave back-folding directional microwave detection antenna 10 is shown in FIG. 9A. According to the preferred embodiment of the tuning structure, one end of the loading branch 15, which is offset to the feed end 111 of the half-wave oscillator 11, is electrically connected to the half-wave oscillator 11. At the same time, the feed line 13 and the half-wave oscillator 11 are formed in an elongated columnar shape that the feed line 13 is thicker than the half-wave oscillator 11.

Particularly, based on the structure of the half-wave back-folding directional microwave detection antenna 10 (corresponding to FIGS. 7A to 11C), the half-wave oscillator 11 is configured on the same plane, wherein the distance between the feed end 111 of the half-wave oscillator 11 and the reference ground 12 is smaller than the distance between the other end of the half-wave oscillator 11 and the reference ground 12, such that the plane of the half-wave oscillator 11 is perpendicular to the reference ground 12. According to the tuning structure of the present invention, the half-wave oscillator 11 is folded back from the end opposite to the feed end 111 and is parallel to the reference ground 12 in sequence, wherein the half-wave oscillator 11 is extended parallel to the reference ground 12 in a direction toward the reference ground 12 and the opposite direction of the reference ground 12. Correspondingly, the half-wave oscillator 11 has two coupling portions 112 extended in the same direction from the two ends and a connecting portion 113 extended between the two coupling portions 112 in a direction perpendicular to the reference ground 12, wherein the feed line 13 is thickened in an extension direction of each of the two coupling portions 112 of the half-wave oscillator 11.

Furthermore, the loading branch 15 is extended from the connecting portion 113 in a direction toward the reference ground 12, wherein the loading branch 15 has a physical length of 2.6 mm within a 20% error range. The coupling portion 112 at the feed end 111 has a physical length of 11.55 mm within an error range of 20% while the other coupling portion 112 has a physical length of 14.50 mm within a 20% error range. The distance between the coupling portion 112 at the feed end 111 and the reference ground 12 is about 3.00 mm within an error range of 20%. In other words, the distance between the feed end 111 and the reference ground 12 is about 3.00 mm within a 20% error range, and the distance between the two coupling portions 112 is about 1.2 mm within a 20% error range.

Figure 12A:
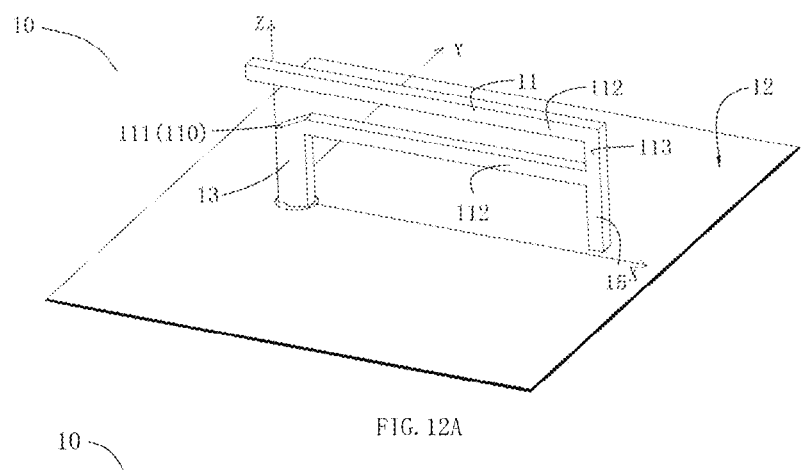
FIG. 12A is a perspective view of a preferred tuning structure of the half-wave back-folding directional microwave detection antenna according to the above preferred embodiment of the present invention.
Figure 12B:
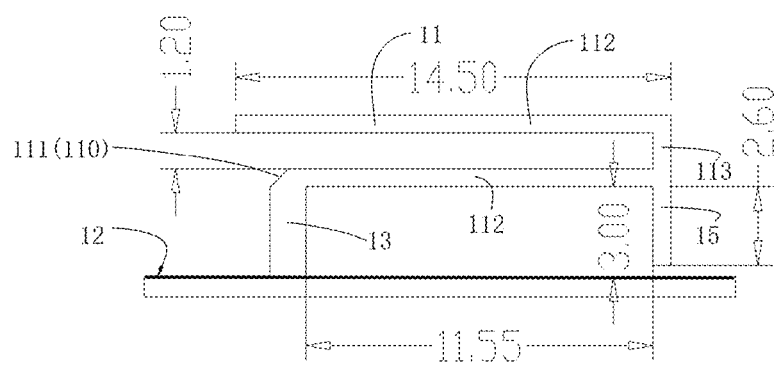
FIG. 12B is a schematic diagram illustrating the dimensional size of the preferred tuning structure of the half-wave back-folding directional microwave detection antenna according to the above preferred embodiment of the present invention.
Figure 12C:
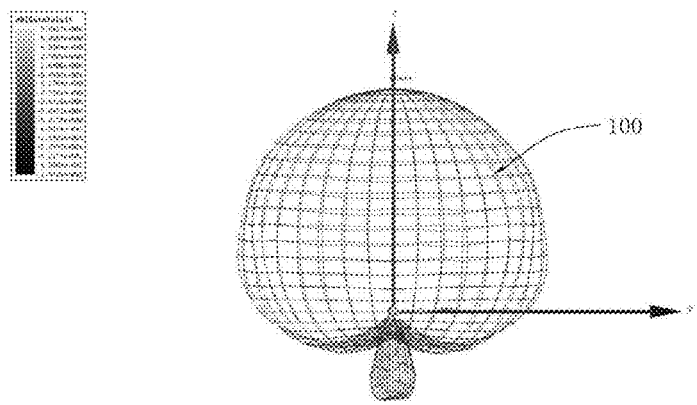
FIG. 12C illustrates a radiation pattern of the preferred tuning structure of the half-wave back-folding directional microwave detection antenna according to the above preferred embodiment of the present invention.
Figure 12D:
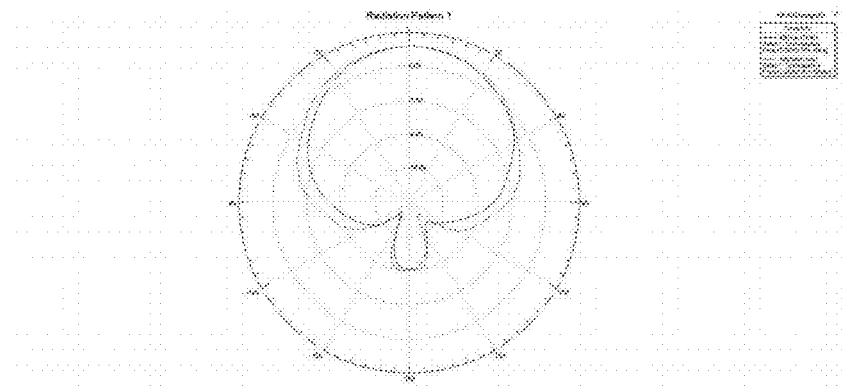
FIG. 12D is a two-dimensional radiation pattern of the preferred tuning structure of the half-wave back-folding directional microwave detection antenna according to the above preferred embodiment of the present invention.
Figure 12E:
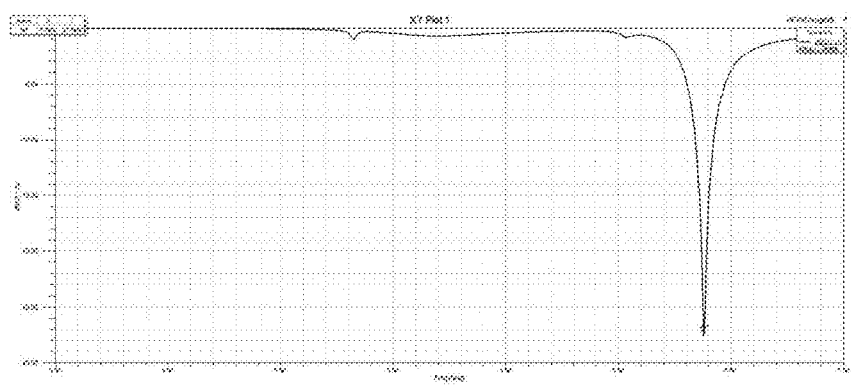
FIG. 12E illustrates a S11 curve of the preferred tuning structure of the half-wave back-folding directional microwave detection antenna according to the above preferred embodiment of the present invention.

Referring to FIGS. 12C to 12E, the backward radiation of the half-wave back-folding directional microwave detection antenna 10 based on the above structure and the reference ground 12 as a boundary is significantly weakened and has better directional radiation characteristics. The radiation gain of the half-wave back-folding directional microwave detection antenna 10 is up to 7.5 dB in the directional radiation direction and the beam angle of the half-wave back-folding directional microwave detection antenna 10 is relatively large (corresponding to FIG. 12D is greater than 80 degrees). Corresponding to the vertical detection application, the detection area covered by the half-wave back-folding directional microwave detection antenna 10 is relatively larger. Corresponding to the horizontal detection application, the radiation sector angle of the half-wave back-folding directional microwave detection antenna 10 is also larger and its detection area is larger. Incorporating with the high gain characteristics of the half-wave back-folding directional microwave detection antenna 10, the half-wave back-folding directional microwave detection antenna 10 has longer detection distance and larger sector angle to provide larger and deeper microwave detection area. Furthermore, the S11 curve of the half-wave back-folding directional microwave detection antenna 10 shows the obvious resonance frequency near 5.8 GHz to match with the ISM operating frequency band of 5.8 GHz. At the same time, the S11 curve of the half-wave back-folding directional microwave detection antenna 10 has a loss as low as −20 dB at the resonance frequency and has a relatively narrower bandwidth, such that the half-wave back-folding directional microwave detection antenna 10 has excellent anti-interference performance.

It is worth mentioning that, according to the structure of the half-wave back-folding directional microwave detection antenna 10 of the present invention, in view of the loading branch 15 to the electrical length of the half-wave oscillator 11, the conversion of the physical length of the half-wave oscillator 11 based on the electrical length of the half-wave oscillator 11 can have an error of 20%. Corresponding to the half-wave oscillator 11 is located in the air as a medium, the half-wave oscillator 11 has a physical length greater than or equal to 0.4 k and lesser than or equal to 0.9 k.

It should be understood that, according to the structure of the half-wave back-folding directional microwave detection antenna 10 of the present invention, the resonance frequency of the half-wave back-folding directional microwave detection antenna 10 is at the half-wave oscillator 11, under the limitation of the fixed connection between the loading branch 15 and the feed line 13, the electrical lengths of the wavelength of the half-wave oscillator 11, the loading branch 15 and the feed line 13 are determined. Under the unchanged conditions of the electrical lengths of the wavelength of the half-wave oscillator 11, the loading branch 15 and the feed line 13, and their connections between each other, the slight deformation of the half-wave oscillator 11 is formed based on the mass production errors and daily use will hardly affect the working parameters of the half-wave back-folding directional microwave detection antenna 10. The half-wave back-folding directional microwave detection antenna 10 has good consistency and stability corresponding to the Doppler microwave detection device.

Figure 13:
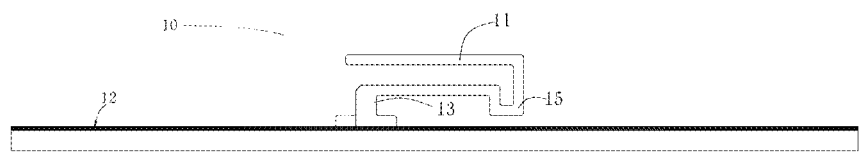
FIG. 13 is a schematic diagram of a second preferred tuning structure of the half-wave back-folding directional microwave detection antenna according to the above preferred embodiment of the present invention.

Furthermore, based on the structural principle of the half-wave back-folding directional microwave detection antenna 10 as shown in FIGS. 5A and 5B, under the structural configurations of "the half-wave oscillator has an electrical length greater than or equal to ½ and less than or equal to ¾ wavelength", "the two ends of the half-wave oscillator 11 are close to each other within a distance range greater than or equal to $\lambda/128$ and less than or equal to $\lambda/6$", and "the two ends of the half-wave oscillator 11 are close to the reference ground 12 in a distance range greater than or equal to $\lambda/128$, and at least one end of the half-wave oscillator 11 is close to the reference ground 12 within a distance range of $\lambda/6$ or less to set apart from the reference ground 12", the number, arrangement and structure of the half-wave oscillator 11 should not be limited in the present invention. For example, in one embodiment, the half-wave oscillator 11 is configured to have a micro strip line loaded on the corresponding substrate. For another example, in another embodiment of the present invention, corresponding to FIG. 13, the difference is that the half-wave oscillator 11 is constructed to have two coupling portions 112 extending from its two ends and the connecting portion 113 extended between the two coupling portions 112 in a direction perpendicular to the reference ground 12. According to the preferred embodiment, the connecting portion 113 extended between the two coupling portions 112 has two ends integrally extending toward to and away from the reference ground 12 in sequence.

Figure 14A:
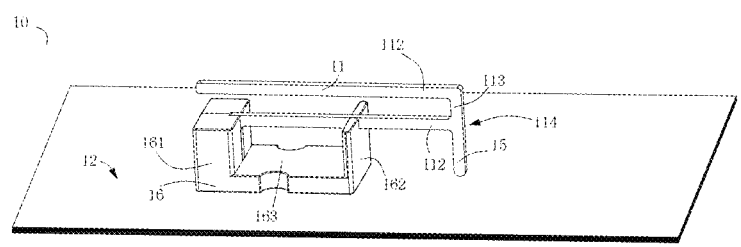
FIG. 14A is a perspective view illustrating the structural diagram of the preferred tuning structure of the half-wave back-folding directional microwave detection antenna according to the above preferred embodiment of the present invention, illustrating a position-limiting support base.
Figure 14B:
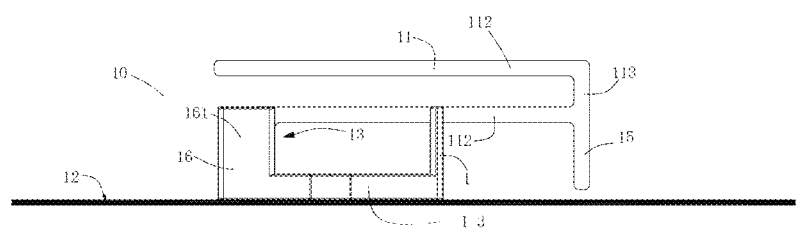
FIG. 14B is a side view of the preferred tuning structure of the half-wave back-folding directional microwave detection antenna according to the above preferred embodiment of the present invention, illustrating the position-limiting support base.

Particularly, in order to reduce the deformation of the half-wave oscillator 11 during its production, assembly and use, the structural stability of the half-wave back-folding directional microwave detection antenna 10 is further optimized. The optimization by the tuning structure of the half-wave back-folding directional microwave detection antenna 10 is shown in FIG. 12A as an example. The half-wave back-folding directional microwave detection antenna 10 further comprises a position limiting base 16 as shown in FIGS. 14A and 14B, wherein the position limiting base 16 is configured to support and/or affix the half-wave oscillator 11. The half-wave oscillator 11 is supported and/or affixed by the position limiting base 16 based on the corresponding shape of the position limiting base 16. The loss of the half-wave back-folding directional microwave detection antenna 10 can be reduced via the contact between the position limiting base 16 and the half-wave oscillator 11, and the medium between the position limiting base 16 and the half-wave oscillator 11 and between the position limiting base 16 and the reference ground 12, so as to ensure the structural stability and the performance stability of the half-wave back-folding directional microwave detection antenna 10 at the same time.

Particularly, the position limiting base 16 comprises a base 163, a damper 161 extended from the base 163, and a half-wave oscillator supporter 162, wherein the damper 161 is configured to clamp the feed line 13 in order to support and limit the position of the half-wave oscillator 11. Accordingly, when the feed line 13 is clamped by the damper 161, the end of the half-wave oscillator supporter 162 is extended to support half-wave oscillator 11, such that the half-wave oscillator 11 is supported and fixed when the base 163 is fixed.

It is worth mentioning that when the feed line 13 is clamped by the damper 161, the half-wave oscillator 11 is integrally extended from the feed line 13 to be affixed at the base 163, so as to prevent any direct contact between the damper 161 and the half-wave oscillator 11 and to avoid any affect on the medium between the half-wave oscillator 11 and the reference ground 12. Therefore, the contact between the position limiting base 16 and the half-wave oscillator 11 will be reduced while the loss from the position limiting base 16 on the medium between the half-wave oscillator 11 and the reference ground 12 will be avoided.

Preferably, when the feed line 13 is clamped by the damper 161, the end of the half-wave oscillator supporter 162 opposite to the half-wave oscillator 11 has a distance range of $\lambda/16$ to $\lambda/4$ from the feed end 111 to reduce the loss caused by the direct contact between the half-wave oscillator supporter 162 and the half-wave oscillator 11, so as to further reduce the loss caused by the contact between the position limiting base 16 and the half-wave oscillator 11.

Figure 15A:
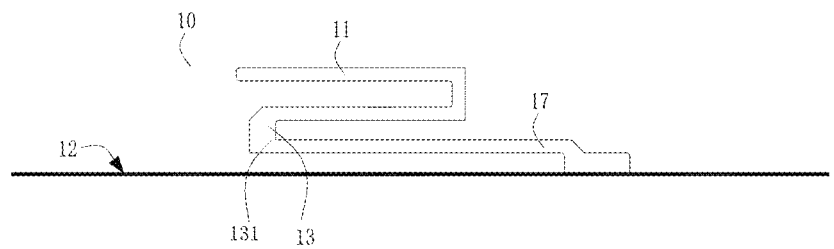
FIG. 15A is a schematic diagram illustrating a third preferred tuning structure of the half-wave back-folding directional microwave detection antenna according to the above preferred embodiment of the present invention.
Figure 15B:
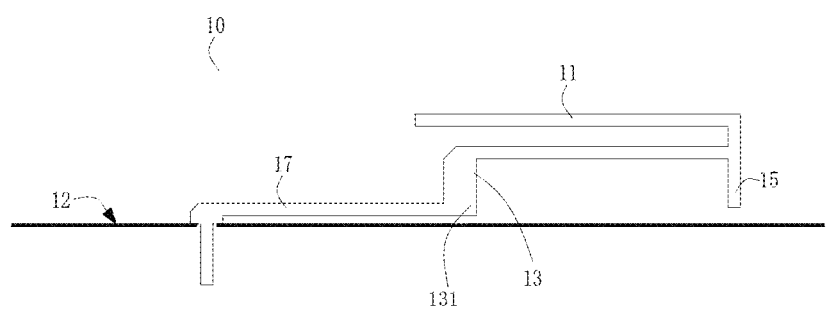
FIG. 15B is a perspective view illustrating the structural diagram of the preferred tuning structure of the half-wave back-folding directional microwave detection antenna according to the above preferred embodiment of the present invention, illustrating the position-limiting support base.

Referring to FIGS. 15A and 15B of the drawings of the present invention, other two tuning structures of the half-wave back-folding directional microwave detection antenna 10 are illustrated based on FIG. 9A. Particularly, according to the two tuning structures, the half-wave back-folding directional microwave detection antenna 10 further comprises a microstrip transmission line 17, wherein the microstrip transmission line 17 has one end connected to the fixing end 131 of the feed line 13 and is spaced apart from the reference ground 12 with a distance range of $\lambda/16$ or less. The corresponding impedance is matched based on the length setting of the microstrip transmission line 17, and at the same time, the loss of the microstrip transmission line 17 is reduced based on the structural configuration that the microstrip transmission line 17 spaced from the reference ground 12 with a distance range less than or equal to $\lambda/16$, so as to ensure the gain of the half-wave back-folding directional microwave detection antenna 10. When the other end of the microstrip connecting line 17 is electrically coupled with the corresponding excitation circuit to receive the excitation signal, the half-wave oscillator 11 is fed at the feed point 110 of the half-wave oscillator 11 through the feed line 13 at the feed point 110 where the electrical connection between the half-wave oscillator 11 and the reference ground 12.

It is worth mentioning that the microstrip transmission line 17 is spaced away from the reference ground 12 with a distance range less than or equal to $\lambda/16$, wherein the extension direction and structure of the microstrip transmission line 17 can be varied. According to the two tuning structures as shown in FIGS. 15A and 15B, the microstrip transmission line 17 has a reverse extension direction. For another tuning structure of the half-wave back-folding directional microwave detection antenna 10 of the present invention, the microstrip transmission line 17 is bent and extended to fit the size and line arrangement of the corresponding circuit board.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A half-wave back-folding directional microwave detection antenna for microwave detection, comprising:
   a reference ground; and
   a half-wave oscillator which has an electrical length greater than or equal to ½ wavelength and less than or equal to ¾ wavelength, wherein said half-wave oscillator is folded back to form a feed point at a position of said half-wave oscillator that a distance between a first end and a second end of said half-wave oscillator is greater than or equal to $\lambda/128$ and is lesser than or equal to $\lambda/6$, wherein said first end of said half-wave oscillator is defined as a far end of said half-wave oscillator and said second end of said half-wave oscillator close to said feed point thereof is defined as a feed end of said half-wave oscillator, wherein said feed point is offset from said far end of said half-wave oscillator and is close to said feed end of said half-wave oscillator, wherein said far end and said feed end of said half-wave oscillator are spaced apart from said reference ground with a distance greater than or equal to $\lambda/128$, and a distance between at least one of said far end and said feed end of said half-wave oscillator and said reference ground is lesser than or equal to $\lambda/6$, wherein a distance between said feed end of said half-wave oscillator and said reference ground is lesser than or equal to a distance between said far end of said half-wave oscillator and said reference ground, such that when said half-wave oscillator is fed for receiving an excitation signal at said feed point, said far end and said feed end of said half-wave oscillator form a phase difference and are coupled to each other, wherein $\lambda$ is wavelength parameter corresponding to frequency of the excitation signal.

2. The half-wave back-folding directional microwave detection antenna, as recited in claim 1, further comprising a feed line, wherein one end of said feed line is electrically connected to said feed point of said half-wave oscillator and is extended toward said reference ground, wherein said feed line has an electrical length greater than or equal to $1/128$ and lesser than or equal to ¼ wavelength, wherein when another end of said feed line is configured for electrically coupling with an excitation circuit to generate the excitation signal, said half-wave oscillator is fed at said feed point through said feed line.

3. The half-wave back-folding directional microwave detection antenna, as recited in claim 2, further comprising at least a loading branch electrically connected to said half-wave oscillator between said far end and said feed end thereof.

4. The half-wave back-folding directional microwave detection antenna, as recited in claim 3, wherein said half-wave oscillator, having an elongated columnar shape, has two coupling portions extended in the same direction from said far end and said feed end and parallel to said reference ground, and a connecting portion extended between said two coupling portions in a direction perpendicular to said reference ground.

5. The half-wave back-folding directional microwave detection antenna, as recited in claim 4, wherein said feed line is thickened in an extension direction of each of said two coupling portions of said half-wave oscillator.

6. The half-wave back-folding directional microwave detection antenna, as recited in claim 5, further comprising a microstrip transmission line, wherein said end of said feed line far from said feed point is defined as a fixing end, wherein said microstrip transmission line has one end connected to said fixing end of said feed line and is spaced apart from said reference ground with a distance range of $\lambda/16$ or less.

7. The half-wave back-folding directional microwave detection antenna, as recited in claim 6, wherein said microstrip transmission line is configured to extend from said fixing end in the same direction corresponding to an extension direction of said coupling portion.

8. The half-wave back-folding directional microwave detection antenna, as recited in claim 6, wherein said microstrip transmission line is configured to extend from said fixing end in an opposite direction corresponding to an extension direction of said coupling portion.

9. The half-wave back-folding directional microwave detection antenna, as recited in claim 6, further comprising a position limiting base which comprises a base, a clamper extended from said base, and a half-wave oscillator supporter, wherein said clamper is configured to clamp said feed line in order to support and limit a position of said half-wave oscillator, wherein when said feed line is clamped by said clamper, one end of said half-wave oscillator supporter is extended to support half-wave oscillator, such that said half-wave oscillator is supported and fixed when said base is fixed.

10. The half-wave back-folding directional microwave detection antenna, as recited in claim 9, wherein when said feed line is clamped by said clamper, said end of said half-wave oscillator supporter opposite to said half-wave oscillator has a distance range of $\lambda/16$ to $\lambda/4$ from said feed end, wherein said feed point is located at said feed end.

11. The half-wave back-folding directional microwave detection antenna, as recited in claim 5, wherein at least one said loading branch is extended from said connecting portion in a direction toward said reference ground.

12. The half-wave back-folding directional microwave detection antenna, as recited in claim 11, wherein said loading branch is extended from said connecting portion in a direction toward said reference ground to electrically connect to said reference ground.

13. The half-wave back-folding directional microwave detection antenna, as recited in claim 11, wherein a physical length of said coupling portion extending from said feed end of said half-wave oscillator is smaller than a physical length of another said coupling portion, such that said far end and said feed end of said half-wave oscillator are interlaced in a direction perpendicular to said reference ground.

14. The half-wave back-folding directional microwave detection antenna, as recited in claim 2, further comprising a position limiting base which comprises a base, a clamper extended from said base, and a half-wave oscillator supporter, wherein said clamper is configured to clamp said feed line in order to support and limit a position of said half-wave oscillator, wherein when said feed line is clamped by said clamper, one end of said half-wave oscillator supporter is extended to support said half-wave oscillator, such that said half-wave oscillator is supported and fixed when said base is fixed.

15. The half-wave back-folding directional microwave detection antenna, as recited in claim 14, wherein when said feed line is clamped by said clamper, said end of said half-wave oscillator supporter opposite to said half-wave oscillator has a distance range of $\lambda/16$ to $\lambda/4$ from said feed end thereof.

16. The half-wave back-folding directional microwave detection antenna, as recited in claim 15, wherein said feed point is located at said feed end of said half-wave oscillator.

17. A half-wave back-folding directional microwave detection antenna for microwave detection, comprising:
a reference ground; and
a half-wave oscillator which has an electrical length greater than or equal to ½ wavelength and less than or equal to ¾ wavelength, wherein said half-wave oscillator is folded back to form a feed point at a position that a distance between a first end and a second end of said half-wave oscillator is greater than or equal to $\lambda/128$ and is lesser than or equal to $\lambda/6$, wherein said feed point is offset from said first end of said half-wave oscillator and is close to said second end of said half-wave oscillator, wherein when said half-wave oscillator is fed for receiving an excitation signal at said feed point, said first end and said second end of said half-wave oscillator form a phase difference and are coupled to each other, wherein $\lambda$ is wavelength parameter corresponding to frequency of the excitation signal, wherein said first end and said second end of said half-wave oscillator are spaced apart from said reference ground with a distance greater than or equal to $\lambda/128$, and a distance between at least one of said first end and said second end of said half-wave oscillator and said reference ground is lesser than or equal to $\lambda/6$, wherein said half-wave oscillator has two coupling portions extended in the same direction from said first end and said second end thereof and parallel to said reference ground; and
a feed line, which is thickened in an extension direction of each of said two coupling portions of said half-wave oscillator.

18. The half-wave back-folding directional microwave detection antenna, as recited in claim 17, further comprising a microstrip transmission line, wherein said end of said feed line far from said feed point is defined as a fixing end, wherein said microstrip transmission line has one end connected to said fixing end of said feed line and is spaced apart from said reference ground with a distance range of $\lambda/16$ or less.

19. The half-wave back-folding directional microwave detection antenna, as recited in claim 18, wherein said microstrip transmission line is configured to extend from said fixing end in the same direction corresponding to an extension direction of said coupling portion.

20. The half-wave back-folding directional microwave detection antenna, as recited in claim 18, wherein said microstrip transmission line is configured to extend from said fixing end in an opposite direction corresponding to an extension direction of said coupling portion.

21. The half-wave back-folding directional microwave detection antenna, as recited in claim 17, wherein at least one said loading branch is extended from said connecting portion in a direction toward said reference ground.

22. The half-wave back-folding directional microwave detection antenna, as recited in claim 21, wherein said loading branch is extended from said connecting portion in a direction toward said reference ground to electrically connect to said reference ground.

23. The half-wave back-folding directional microwave detection antenna, as recited in claim 21, wherein a physical length of said coupling portion extending from said second end of said half-wave oscillator is smaller than a physical length of another said coupling portion, such that said two ends of said half-wave oscillator are interlaced in a direction perpendicular to said reference ground.

24. The half-wave back-folding directional microwave detection antenna, as recited in claim 17, further comprising a position limiting base which comprises a base, a clamper extended from said base, and a half-wave oscillator supporter, wherein said clamper is configured to clamp said feed line in order to support and limit a position of said half-wave oscillator, wherein when said feed line is clamped by said clamper, one end of said half-wave oscillator supporter is extended to support half-wave oscillator, such that said half-wave oscillator is supported and fixed when said base is fixed.

25. The half-wave back-folding directional microwave detection antenna, as recited in claim 24, wherein when said feed line is clamped by said clamper, said end of said half-wave oscillator supporter opposite to said half-wave oscillator has a distance range of $\lambda/16$ to $\lambda/4$ from said second end.

26. The half-wave back-folding directional microwave detection antenna, as recited in claim 25, wherein said feed point is located at said second end.

* * * * *